(12) United States Patent
Morita et al.

(10) Patent No.: US 7,863,847 B2
(45) Date of Patent: Jan. 4, 2011

(54) POWER UNIT

(75) Inventors: Hideki Morita, Wako (JP); Tetsurou Hamada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 360 days.

(21) Appl. No.: 12/216,585

(22) Filed: Jul. 8, 2008

(65) Prior Publication Data

US 2009/0033250 A1 Feb. 5, 2009

(30) Foreign Application Priority Data

Jul. 30, 2007 (JP) ............................. 2007-197995

(51) Int. Cl.
B60K 6/00 (2007.10)
B60L 11/14 (2006.01)
H02K 23/60 (2006.01)

(52) U.S. Cl. .................. 318/539; 318/540; 310/115; 475/5; 180/65.1; 180/65.6

(58) Field of Classification Search ............... 318/715, 318/730, 540, 49, 539; 475/1, 2, 149, 153, 475/6; 180/54.1, 65.1, 337, 343, 65.6, 65.7, 180/65.8; 310/10, 22, 49.38, 49.39, 154.33, 310/114, 115; 290/1 C, 28, 38 R; 903/902, 903/917, 906, 915; 361/53
See application file for complete search history.

(56) References Cited

U.S. PATENT DOCUMENTS 5,225,744 A * 7/1993 Ishikawa et al. ............ 318/139
5,346,441 A * 9/1994 Kurz et al. .................. 475/116
6,005,358 A * 12/1999 Radev ....................... 318/139

(Continued)

FOREIGN PATENT DOCUMENTS

DE 296 24 299 U 1 1/2002

(Continued)

OTHER PUBLICATIONS

Erik Nordlund et al., "The Four-Quadrant Energy Transducer", Conference Record of the 2002 IEEE Industry Applications Conference, Oct. 2002, pp. 390-397.

(Continued)

*Primary Examiner*—Walter Besnon
*Assistant Examiner*—Eduardo Colon
(74) *Attorney, Agent, or Firm*—Squire, Sanders & Dempsey L.L.P.

(57) ABSTRACT

A power unit which makes it possible to reduce power transmitted from a prime mover to a driven part via an electrical path, to thereby increase the efficiency of driving the driven part. A first rotating machine of the power unit inputs and outputs energy between a stator and first and second rotors thereof, via magnetic circuits formed by generation of a rotating magnetic field, and the rotating magnetic field, and the rotors rotate while maintaining a linear relation in which respective differences in rotational speed between the rotating magnetic field and the second rotor, and between the second and first rotors are equal. The rotors are mechanically connected to a prime mover and a transmission, respectively. A second rotating machine of the power unit is mechanically connected to a drive part without via the transmission, and electrically connected to the stator.

3 Claims, 20 Drawing Sheets

U.S. PATENT DOCUMENTS

| | | | | |
|---|---|---|---|---|
| 6,159,127 | A | * | 12/2000 | Loeffler et al. ............ 477/5 |
| 6,401,849 | B1 | * | 6/2002 | Seguchi et al. ............ 180/65.6 |
| 7,497,285 | B1 | * | 3/2009 | Radev ............ 180/65.225 |
| 2003/0181276 | A1 | * | 9/2003 | Minagawa et al. ............ 475/5 |
| 2007/0213158 | A1 | * | 9/2007 | Laeuffer ............ 475/5 |
| 2008/0142284 | A1 | * | 6/2008 | Qu et al. ............ 180/65.6 |
| 2010/0025128 | A1 | * | 2/2010 | Abe et al. ............ 180/65.25 |
| 2010/0056312 | A1 | * | 3/2010 | Akutsu et al. ............ 475/1 |
| 2010/0071974 | A1 | * | 3/2010 | Akutsu et al. ............ 180/65.265 |
| 2010/0170732 | A1 | * | 7/2010 | Glaser et al. ............ 180/65.245 |

FOREIGN PATENT DOCUMENTS

| | | |
|---|---|---|
| EP | 1 340 645 A2 | 9/2003 |
| FR | 2 834 248 A1 | 7/2003 |
| FR | 2 834 938 A1 | 7/2003 |
| JP | 2000-197324 | 7/2000 |

OTHER PUBLICATIONS

European Search Report 08159708.0-2421/2020326 dated Jul. 9, 2009.

* cited by examiner

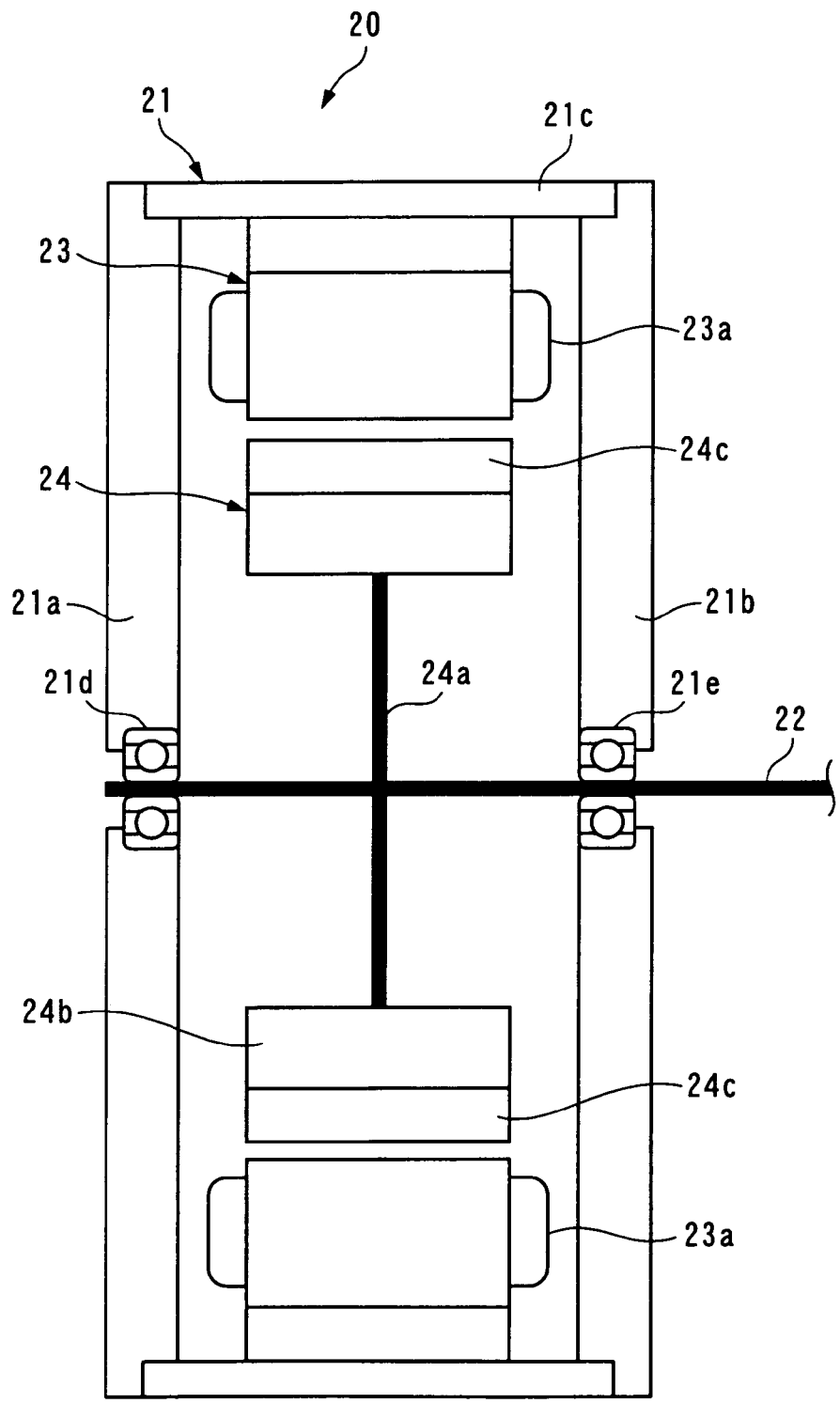
F I G. 3

POWER UNIT

BACKGROUND OF THE INVENTION

1. Field of the Invention

The present invention relates to a power unit for driving driven parts for propelling a transport machine.

2. Description of the Related Art

Conventionally, as a power unit of this kind, one disclosed e.g. in Japanese Laid-Open Patent Publication (Kokai) No. 2000-197324 is known. This power unit is for driving drive wheels of a vehicle, and is provided with an internal combustion engine, and first and second rotating machines. The first rotating machine has a stator formed by a plurality of armatures, an intermediate rotor formed by winding coil around an iron core, and an inner rotor formed by a permanent magnet. The stator, the intermediate rotor, and the inner rotor are arranged in this order from the outside to the inside in a radial direction. Further, in the first rotating machine, an induction machine is formed by the stator and the intermediate rotor, and a synchronous machine is formed by the intermediate rotor and the inner rotor. The above-mentioned second rotating machine is a general one-rotor type, and has a stator formed by a plurality of armatures, and a rotor formed by a permanent magnet.

The intermediate rotor of the first rotating machine is mechanically connected to the crankshaft of the engine, and the inner rotor of the same to the rotor of the second rotating machine, and a rotor of the second rotating machine is mechanically connected to the drive wheels. Further, the stators of the first and second rotating machines are electrically connected to a battery via a first controller and a second controller, each formed by e.g. an inverter.

In the conventional power unit constructed as described above, during running of a vehicle on which the power unit is installed, the power of the engine is transmitted to the drive wheels, while changing the speed thereof in the following manner: When the rotational speed of the engine is higher than that of the drive wheels, part of the power from the engine is used to generate electric power by the first rotating machine. This converts the part of the power from the engine into DC power by the stator of the first rotating machine, whereby power generation is performed, and at the same time, the remainder of the power from the engine is electromagnetically transmitted to the inner rotor via the intermediate rotor, and then is transmitted to the drive wheels. The electric power thus generated is supplied to the stator of the second rotating machine via the first and second controllers, and the power thus generated by the rotor of the second rotating machine is transmitted to the drive wheels. During this process, by controlling the electric power generated by the first rotating machine and the power of the second rotating machine, the power of the engine is transmitted to the drive wheels while steplessly changing the speed thereof.

As described above, in the conventional power unit, transmission of power of the engine to the drive wheels is performed via a first path formed by the intermediate rotor, magnetism, and the inner rotor, and a second path formed by the intermediate rotor, magnetism, the stator of the first rotating machine, the first and second controllers, the stator of the second rotating machine, magnetism, and the rotor of the second rotating machine. In the first path, the power of the engine is transmitted by a so-called magnetic path formed by magnetism generated in the intermediate rotor, and hence it is possible to obtain a relatively high transmission efficiency. On the other hand, in the second path, the power of the engine is transmitted via a so-called electrical path in which the power is once converted into DC power, and is then converted back into power (kinetic power), so that conversion loss of the inverter or loss by generation of Joule heat occurs to make the transmission efficiency via this path lower than that via the magnetic path.

In the conventional power unit, due to the arrangement thereof, approximately half of the power of the engine is transmitted to the drive wheels by the electrical path via the second path, and hence the driving efficiency of the power unit becomes lower. For the same reason, the second rotating machine is increased in size to increase its weight and manufacturing costs. Further, since the induction machine is formed by the stator and the intermediate rotor, when the electric power is generated by the first stator, Joule heat is generated not only in the coil of the first stator but also in the coil of the intermediate rotor, which prevents the sufficient power generation efficiency from being obtained, to further lower the driving efficiency of the power unit. Further, since the intermediate rotor is formed by winding coil around the iron core, the durability of the intermediate rotor is relatively low, and in turn, the durability of the whole power unit is also low. Further, there is a fear that the intermediate rotor, which is so low in durability, cannot withstand the repeated transmission of the power from the engine connected thereto, and becomes incapable of properly transmitting the power to the drive wheels.

SUMMARY OF THE INVENTION

It is an object of the present invention to provide a power unit which makes it possible to reduce power transmitted from a prime mover to a driven part by an electrical path, to thereby increase the efficiency of driving the driven part.

To attain the above object, the present invention provides a power unit that drives a driven part for propelling a transport mechanism, comprising a prime mover, a transmission that is mechanically connected to the prime mover, a first rotating machine including an immovable stator for generating a rotating magnetic field, a first rotor formed by magnets and disposed in an opposed relation to the stator, and a second rotor formed of a soft magnetic material and disposed between the stator and the first rotor, the first rotating machine being configured to input and output energy between the stator, the first rotor, and the second rotor, via magnetic circuits formed by generation of the rotating magnetic field, and such that in accordance with the energy input and output, the rotating magnetic field, and the first and second rotors rotate while maintaining a linear relation in which a difference in a rotational speed of the rotating magnetic field and a rotational speed of the second rotor, and a difference between the rotational speed of the second rotor and a rotational speed of the first rotor are equal to each other, the second rotor being mechanically connected to the prime mover, and the first rotor being mechanically connected to the transmission, and a second rotating machine mechanically connected to the driven part without via the transmission, and electrically connected to the stator.

With the arrangement of the power unit according to the present invention, as shown in FIG. 19, the second rotor of the first rotating machine is mechanically connected to the prime mover, and the first rotor is mechanically connected to the driven part via the transmission. Further, the second rotating machine is mechanically connected to the driven part without via the transmission, and is electrically connected to the stator of the first rotating machine. It should be noted that in FIG. 19, connections between the elements are expressed such that a mechanical connection is indicated by a solid line, an electrical connection by a one-dot-chain line, and a magnetic connection by a broken line. Further, a flow of the power or the electric power is indicated by a thick line with an arrow head. Further, a connection relationship between the second rotating machine and the driven part is illustrated in FIG. 19 only by way of example.

Further, in the first rotating machine, the energy is input and output between the stator and the first and second rotors via magnetic circuits formed by generation of a rotating magnetic field of the stator. Along with the energy input and output, the rotating magnetic field and the first and second rotors rotate while maintaining a linear relationship in which the difference between the rotational speed of the rotating magnetic field and that of the second rotor, and the difference between the rotational speed of the second rotor and that of the first rotor are equal to each other. Therefore, the speed relationship between the three of the rotating magnetic field and the first and second rotors is expressed e.g. as shown in FIG. 20. The linear speed relationship between the three of the rotating magnetic field and the first and second rotors corresponds to the speed relationship between one and the other of the sun gear and ring gear of the planetary gear unit, and the carrier supporting the planetary gears (hereinafter, the sun gear, the ring gear, and the carrier are referred to as "the three elements").

It should be noted that $\alpha$, $\beta$, and $\gamma$ in FIG. 20 denote lines indicative of the speed of the driven part, and respectively represent cases where the transmission ratio of the transmission is equal to a predetermined value $R\alpha$, $R\beta$, and $R\gamma$ ($R\alpha>1$, $R\alpha<R\beta<R\gamma$), respectively. Further, FIG. 20 shows a case where the second rotor and the prime move are directly connected to each other, and hence the rotational speeds of the both are equal to each other as shown therein.

Further, from the above-described relationship in speed, the relationship in the input and output energy between the stator, the first and second rotors is the same as that between the three elements of the planetary gear unit. Therefore, in the first rotating machine, the power (energy) transmitted to the second rotor is distributed via magnetic circuits to the stator and the first rotor. In this case, as described above, the difference between the rotational speed of the rotating magnetic field and that of the second rotor, and the difference between the rotational speed of the second rotor and that of the first rotor are equal to each other. For this reason, assuming that torque equivalent to the electric power generated by the stator and the rotational speed of the magnetic field is defined as the electric power-generating equivalent torque, and torque transmitted to the first rotor is defined as first rotor transmission torque, the torque transmitted to the second rotor is distributed at a torque distribution ratio of 1:1 to the stator and the first rotor as the electric power-generating torque and the first rotor transmission torque, respectively. Therefore, the distribution ratio of energy (power and electric power) is equal to a ratio between the rotational speed of the magnetic field and the rotational speed of the first rotor. Hereinafter, the rotational speed of the rotating magnetic field, the rotational speed of the first rotor, and the rotational speed of the second rotor are referred to as "the magnetic field rotational speed", "the first rotor rotational speed", and "the second rotor rotational speed", respectively.

With the above-described arrangement of the power unit according to the present invention, the power of the prime mover is transmitted to the drive part e.g. in the following manner: Specifically, using part of the power of the prime mover, the first rotating machine performs electric power generation, and the generated electric power is supplied to the second rotating machine. During the electric power generation by the first rotating machine, as shown in FIG. 19, part of the power of the prime mover transmitted to the second rotor is transmitted to the stator via the magnetic circuit as electric power, and the remainder of the power transmitted to the second rotor is transmitted to the first rotor via the magnetic circuit as electric power. That is, the power transmitted to the second rotor is distributed to the stator and the first rotor. Further, the electric power generated by the stator is supplied to the second rotating machine wherein it is converted into (kinetic) power, and then is transmitted to the driven part. On the other hand, the power transmitted to the first rotor is transmitted to the driven part via the transmission. As a result, provided that a power transmission loss in each of the elements is ignored, the power equal in magnitude to the power of the prime mover is transmitted to the driven part.

As described above, the power of the prime mover is divided in the first rotating machine, and is transmitted to the driven part via two paths, i.e. a first path formed by the magnetic circuit, the stator, and the second rotating machine, and a second path formed by the first rotor and the transmission. In the first path, the power of the prime mover is transmitted to the driven part by a so-called electrical path in which the power is once converted into electric power, and then converted back into the power, whereas in the second path, the power is transmitted to the driven part without converting into electric power by a so-called magnetic path in which the power is transmitted in a non-contacting manner via the magnetic circuit, and a so-called mechanical path formed by mechanical connections. Therefore, the second path is higher in transmission efficiency than the first path.

As described above, the distribution ratio of the energy (electric power and (kinetic) power) to the stator and the first rotor in the first rotating machine is equal to the ratio between the magnetic field rotational speed and the first rotor rotational speed. From this, the ratio between the power transmitted by the electrical path via the first path and the power transmitted by the magnetic path and the mechanical path via the second path is equal to the ratio between the magnetic field rotational speed and the first rotor rotational speed. On the other hand, the first rotor is connected to the driven part via the transmission, and hence even when the speed of the driven part is lower than that of the second rotor during transmission of the power of the prime mover to the driven part, as is clear from FIG. 20, differently from the case where the first rotor is directly connected to the driven part, it is possible, by controlling the transmission gear ratio of the transmission, to make the first rotor rotational speed higher than the second rotor rotational speed, and hold the magnetic field rotational speed lower than the first rotor rotational speed. This makes it possible to make the power of the prime mover transmitted by the electrical path always smaller than the power of the prime mover transmitted via the magnetic path and the mechanical path, and smaller than half in the case of the conventional power unit described hereinabove. Therefore, it is possible to improve the efficiency of driving efficiency the driven part. For the same reason, it is possible to reduce the size, weight, and manufacturing costs of the second rotating machine.

Further, the power of the prime mover is transmitted to the driven part as described above, and hence during the transmission, by changing the combination of the rotational speed and torque of power transmitted to the driven part via the first path and the rotational speed of power transmitted to the driven part via the second path through control of the magnetic field rotational speed, the rotational speed and torque of the second rotating machine, it is possible to transmit the power of the prime mover to the driven part while steplessly changing the speed of the power. Further, in this case, by controlling the transmission gear ratio of the transmission in combination therewith, as is clear from FIG. 20, it is possible to steplessly increase or reduce the speed of the power transmitted from the prime mover to the driven part, in a state where the rotating magnetic field rotational speed is held lower than the first rotor rotational speed, in other words, in a state where the power transmitted by the electrical path is controlled to be small as described above.

Further, in this case, by controlling the magnetic field rotational speed to 0, all the power of the prime mover transmitted to the second rotor can be transmitted to the first rotor by the magnetic circuit. That is, the transmission of the power from the prime mover to the driven part can be performed without using the electrical path at all, but using only the magnetic path and the mechanical path, whereby it is possible to further increase the driving efficiency.

Further, differently from the intermediate rotor of the conventional power unit, the second rotor is formed not by a coil, but of a soft magnetic material, and hence is magnetized by the rotating magnetic field and the permanent magnet of the first rotor, when the energy is input and output between the second rotor, and the stator and the first rotor, the first rotating machine functions as a synchronous machine. This makes it possible to make the efficiency of the first rotating machine higher than that of the conventional one which functions as an induction machine, which makes it possible to further increase the driving efficiency. Further, for the same reason described above, the durability of the second rotor can be made higher than that of the intermediate rotor of the conventional power unit, which in turn makes it possible to improve the durability of the power unit in its entirety. Further, since the second rotor with a high durability is connected to the prime mover, the power unit can fully withstand repeated power transmission from the prime mover, and properly transmit the power to the driven part.

Further, according to the present invention, it is possible to drive the driven part by using the power of the first rotating machine or the second rotating machine without using the power of the prime mover, and when the prime mover is an internal combustion, it is possible to start the engine using the power of the first rotating machine.

Preferably, the transport mechanism is a vehicle, and the driven part comprises a front wheel and a rear wheel of the vehicle, and the transmission is mechanically connected to one of the front wheel and the rear wheel, the second rotating machine being mechanically connected to the other of the front wheel and the rear wheel, and electrically connected to the stator.

With the arrangement of this preferred embodiment, as shown in FIG. 21, the first rotor is mechanically connected to one (illustrated as "one wheel") of the front wheel and the rear wheel via the transmission, and the second rotating machine is mechanically connected to the other (illustrated as "the other wheel") of the front wheel and the rear wheel, and is electrically connected to the stator of the first rotating machine. It should be noted that in FIG. 21, similarly to FIG. 19, connections between the elements are expressed such that a mechanical connection is indicated by a solid line, an electrical connection by a one-dot-chain line, and a magnetic connection by a broken line. Further, a flow of the power or the electric power is indicated by a thick line with an arrow head.

As is clear from the above construction, it is possible to distribute the power of the prime mover to the front wheel and the rear wheel, and drive the both simultaneously, whereby it is possible to realize an all-wheel drive vehicle. In addition, in driving the whole wheels including the front wheel and the rear wheel of the vehicle as the driven part, it is possible to obtain the same advantageous effects as described hereinabove.

Preferably, the transmission is a gear-type stepped transmission including a plurality of gear trains which are different in gear ratio from each other, and outputs power input thereto after changing a speed of the power by one of the gear trains.

With the arrangement of this preferred embodiment, since the transmission is a gear-type stepped transmission, compared with the case of a belt-type stepless transmission, it is possible to reduce the power transmission loss in the transmission. Therefore, it is possible to further improve the driving efficiency. On the other hand, when the prime mover is connected to the driven part including the other wheel via the gear-type stepped transmission, during the speed-changing operation, before connection of a gear train is established for a shift to a desired transmission gear ratio, the torque of the prime mover is not transmitted, and a speed change shock, such as a sudden decrease in the torque caused thereby, can occur. According to the present embodiment, the second rotating machine is connected to the driven part without via the transmission, and hence during the speed-changing operation of the transmission, it is possible to transmit the torque of the second rotating machine to the driven part, which makes it possible to suppress the speed change shock.

The above and other objects, features, and advantages of the present invention will become more apparent from the following detailed description taken in conjunction with the accompanying drawings.

BRIEF DESCRIPTION OF THE DRAWINGS

FIG. 3 is an enlarged cross-sectional view of a second rotating machine;

DETAILED DESCRIPTION OF PREFERRED EMBODIMENTS

Figure 1:
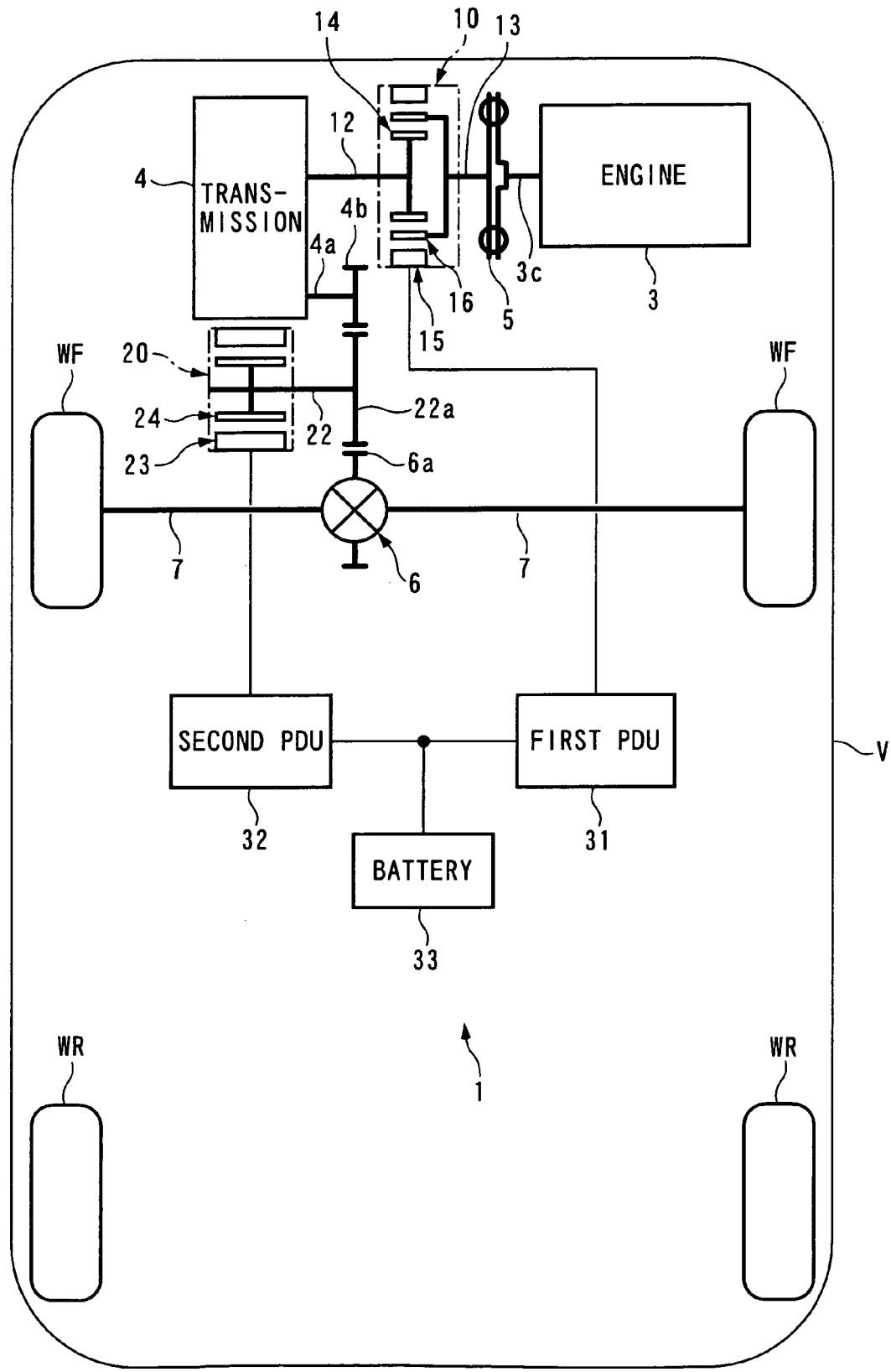
FIG. 1 is a schematic view of a vehicle to which is applied a power unit according to a first embodiment of the present invention.

The invention will now be described in detail with reference to the drawings showing preferred embodiments thereof. FIG. 1 schematically shows a vehicle V on which a power unit 1 according to a first embodiment of the present invention is installed. The vehicle V is a four-wheel vehicle having left and right front wheels WF, WF and left and right rear wheels WR, WR. It should be noted that in the following description, the left side and the right side as viewed in FIG. 1 will be referred to as "left" and "right". This power unit 1 is for driving left and right front wheels WF, WF of the vehicle V, and is provided with an internal combustion engine 3, a first rotating machine 10, and a second rotating machine 20, which are power sources, a transmission 4, a differential gear mechanism 6, and left and right drive shafts 7, 7 for transmitting driving force to the forward wheels WF, WF, and an ECU 2 for controlling the respective operations of the internal combustion engine 3, the transmission 4, and the first and second rotating machines 10 and 20. The first rotating machine 10, the second rotating machine 20, the transmission 4, and the differential gear mechanism 6 are received in a drive-system housing fixed to a cylinder block (none of which are shown).

The internal combustion engine (hereinafter simply referred to as "the engine") 3 is an gasoline engine, for example, and operations of fuel injection valves 3a and ignition of spark plugs 3b are controlled by the ECU 2 (see FIG. 2). Further, a second rotating shaft 13 of the first rotating machine 10, described hereinafter, is concentrically connected to a crankshaft 3c of the engine 3 via a flywheel 5.

The transmission is a gear-type stepped transmission including an input shaft, not shown, and an output shaft 4a, a plurality of gear trains, not shown, different in gear ratio from each other, and clutches, not shown, for engaging and disengaging respectively between the gear trains, and the input shaft and output shaft 4a. The transmission 4 changes the speed of power inputted to the input shaft by using one of the gear trains, and outputs the power to the output shaft 4a. Further, in the transmission 4, a total of four speed positions, i.e. a first speed (transmission gear ratio=e.g. 12), a second speed (transmission gear ratio=e.g. 6), a third speed (transmission gear ratio=e.g. 3) for forward travel, and one speed position for rearward travel can be set using these gear trains, and the ECU 2 controls a change between these speed positions.

Further, a first rotating shaft 12, referred to hereinafter, of the first rotating machine 10 is concentrically connected to the input shaft of the transmission 4. Further, the output shaft 4a of the transmission 4 has a gear 4b integrally formed therewith, and the gear 4b is in mesh with a gear 22a integrally formed with an output shaft 22, referred to hereinafter of the second rotating machine 20. Further, the gear 22a is in mesh with a gear 6a of the differential gear mechanism 6, and the differential gear mechanism 6 is connected to the left and right front wheels WF, WF via the left and right drive shafts, 7, 7 respectively.

The second rotating machine 20 is a general one-rotor type brushless DC motor, and as shown in FIG. 3, is comprised of a casing 21, the rotating shaft 22, a stator 23 and a rotor 24 both provided within the casing 21.

The casing 21 is comprised of left and right side walls 21a, 21b, and a hollow cylindrical peripheral wall 21c fixed to outer peripheral ends of these side walls 21a and 21b, and is fixed to the aforementioned drive-system housing. Bearings 21d and 21e are fitted in the center of the left and right side walls 21a, 21b, respectively. The rotating shaft 22 is rotatably supported by the bearings 21d and 21e. It should be noted that the rotating shaft 22 is made substantially immovable in an axial direction by a thrust bearing (not shown).

The stator 23 is for generating magnetic fields and has a plurality of armatures 23a. The armatures 23a are fixed to the casing 21 and are arranged at equal intervals in the circumferential direction of the rotating shaft 22. Further, the armatures 23a are electrically connected to the ECU 2 via a second power drive unit 32 (hereinafter simply referred to as "the second PDU"). The second PDU 32 is formed by an electric circuit, such as an inverter, and is electrically connected to a battery 33.

The rotor 24 is configured to be rotatable in unison with the rotating shaft 22, and is disposed in opposed relation to the stator 23. More specifically, the rotor 24 is comprised of a rotating disc 24a concentrically fixed to the rotating shaft 22, and an annular fixing portion 24b fixed to an outer peripheral end of the rotating disc 24a. The fixing portion 24b is formed e.g. of a soft magnetic material (e.g. iron), and permanent magnets 24c are mounted on the outer peripheral surface of the fixing portion 24b. The permanent magnets 24c are arranged side by side in the circumferential direction of the rotating shaft 22 at substantially equal intervals, with each adjacent two of the magnets 24c are different in polarity.

In the second rotating machine 20 constructed as describe above, electric power is supplied to the stator 23 from the battery 33 via the second PDU 32 under the control of the ECU 2, to generate a rotating magnetic field, the electric power is transmitted to the rotor 24 as power via magnetism, so that the rotor 24 is rotated together with the rotating shaft 22. Further, the ECU 2 controls the magnitude and frequency of electric current supplied to the stator 23 by controlling the second PDU 32, whereby the torque and rotational speed of the rotor 24 are controlled. Further, when the rotor 24 is rotated by an external force with power supply to the stator 23 stopped, an induced electromotive force is generated in the stator 23, through the control of the second PDU 32 by the ECU 2, whereby electric power generation is performed.

Figure 4:
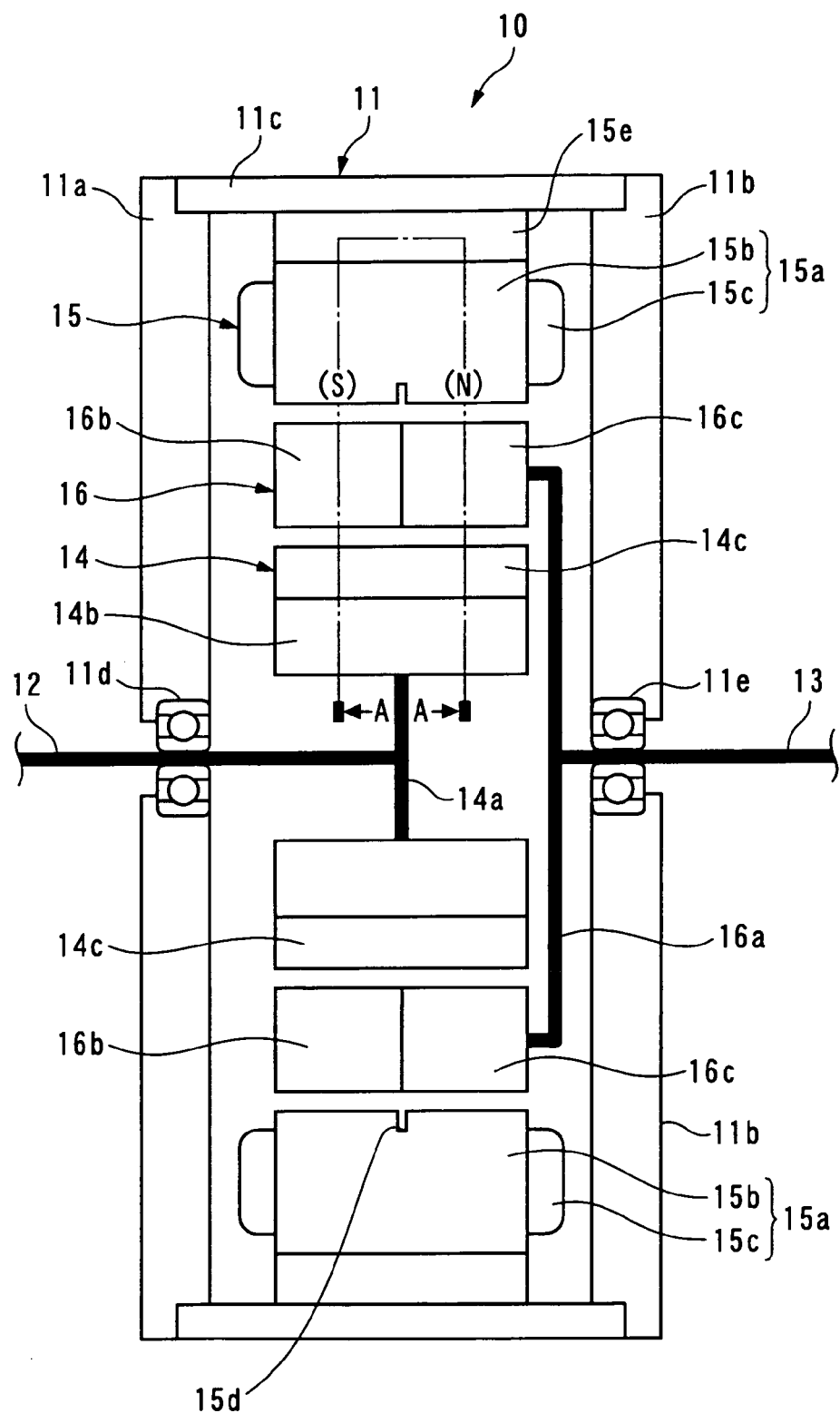
FIG. 4 is an enlarged cross-sectional view of a first rotating machine.

As shown in FIG. 4, the above-mentioned first rotating machine 10 is comprised of a casing 11, the first rotating shaft 12, the second rotating shaft 13 disposed concentrically with the first rotating shaft 12, a first rotor 14 disposed within the casing 11, a stator 15 disposed within the casing 11 in an opposed relation to the first rotor 14, and a second rotor 16 disposed between the two 14 and 15 with predetermined spacing therefrom. The first rotor 14, the second rotor 16, and the stator 15 are arranged from the inner side in the mentioned order in the radial direction of the first and second rotating shafts.

Similarly to the casing 21 of the second rotating machine 20, the casing 11 is comprised of left and right side walls 11a, 11b, and a hollow cylindrical peripheral wall 11c fixed to outer peripheral ends of these side walls 11a and 11b, and is fixed to the drive-system housing. Bearings 11d and 11e are fitted in the center of the left and right side walls 11a, 11b, respectively. The first and second rotating shafts 12 and 13 are rotatably supported by the bearings 11d and 11e. It should be noted that the first and second rotating shafts 12 and 13 are made substantially immovable in an axial direction by respective thrust bearings (not shown).

The first rotor 14 is configured to be rotatable in unison with the first rotating shaft 12, and is comprised of a rotating disc 14a concentrically fixed to a right end of the first rotating shaft 12, and an annular fixing portion 14b fixed to an outer peripheral end of the rotating disc 14a. The fixing portion 14b is formed of a soft magnetic material (e.g. iron), and 2 n permanent magnets 14c are mounted on the outer peripheral surface of the fixing portion 14b. The permanent magnets 14c are arranged side by side in the circumferential direction of the first and second rotating shafts 12 and 13 (hereinafter simply referred to as "the circumferential direction") at substantially equal intervals. Each permanent magnet 14c has a generally sector-shaped cross-section orthogonal to the axial direction of the first and second rotating shafts 12 and 13 (hereinafter simply referred to as "the axial direction") and slightly extends in the axial direction.

Figure 5:
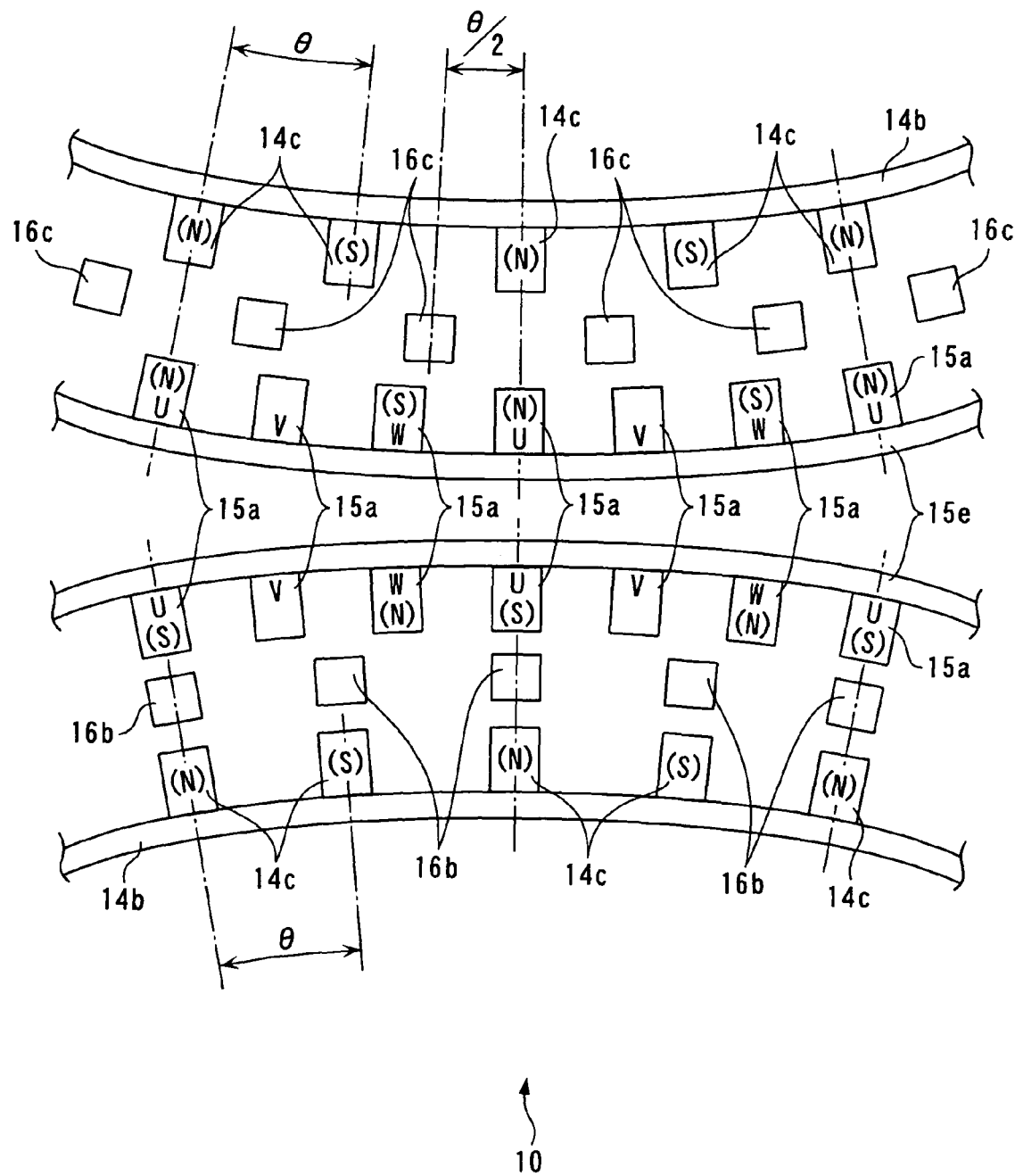
FIG. 5 is a development view of part of a cross-section of the FIG. 1 power transmission drive system taken on line A-A of FIG. 4 during generation of first and second rotating magnetic fields.

Further, as shown in FIG. 5, a central angle formed by each two permanent magnets 14c circumferentially adjacent to each other about the first rotating shaft 12 is a predetermined angle θ. Further, the two permanent magnets 14c circumferentially adjacent to each other have polarities different from each other. Hereafter, respective magnetic poles at left and right ends of the permanent magnet 14c are referred to as "the first magnetic pole" and "the second magnetic pole", respectively.

The stator 15 generates rotating magnetic fields, and has 3 n armatures 15a arranged at equal intervals in the circumferential direction. Each armature 15a is comprised of an iron core 15b, a coil 15c wound around the iron core 15b, and so forth. The iron core 15b has a generally sector-shaped cross-section orthogonal to the axial direction, and has approximately the same axial length as that of the permanent magnet 14c. An axially central portion of the inner peripheral surface of the iron core 15b is formed with a circumferentially extending groove 15d. The 3 n coils 15c form n sets of three-phase coils of U-phase coils, V-phase coils, and W-phase coils (see FIG. 5). Further, the armature 15a are mounted on the casing 11 via an annular fixing portion 15e such that the armatures 15a are immovable. Due to the numbers and the arrangements of the armatures 15a and the permanent magnets 14c, when the center of a certain armature 15a circumferentially coincides with the center of a certain permanent magnet 14c, the center of every third armature 15a from the armature 15a, and the center of every second permanent magnet 14c from the permanent magnet 14c circumferentially coincides with each other.

Furthermore, each armature 15a is electrically connected to the ECU 2 via a first power drive unit 31 (hereinafter simply referred to as "the first PDU"). Similar to the second PDU 32, the first PDU 31 is formed by an electric circuit, such as an inverter and is electrically connected to the second PDU 32 and the battery 33. Further, the armature 15a is configured such that when it is supplied with electric power from the battery 33 or generates electric power, as described hereinafter, magnetic poles having different polarities from each other are generated on the left and right ends of the iron core 15b, respectively. Further, in accordance with generation of these magnetic poles, first and second rotating magnetic fields are generated between the left portion of the first rotor 14 (on the first magnetic pole side) and the left end of the iron core 15b, and between the right portion of the first rotor 14 (on the second magnetic pole side) and the right end of the iron core 15b in a circumferentially rotating manner, respectively. Hereinafter, the magnetic poles generated on the left and right ends of the iron core 15b are referred to as "the first armature magnetic pole" and "the second armature magnetic pole". Further, the number of the first armature magnetic poles and that of the second armature magnetic poles are the same as the number of the magnetic poles of the permanent magnets 14c, that is, 2 n, respectively.

The second rotor 16 is configured to be rotatable in unison with the second rotating shaft 13, and is comprised of a rotating disc 16a concentrically fixed to a left end of the second rotating shaft 13, and a plurality of first cores 16b and second cores 16c fixed to an outer peripheral end of the rotating disc 16a. The first and second cores 16b and 16c are arranged at equal intervals in the circumferential direction, respectively, and the numbers of 16b and 16c are both set to the same number as that of the permanent magnets 14c, that is, 2 n. Each first core 16b is formed by laminating soft magnetic material elements, such as a plurality of steel plates, such that it has a generally sector-shaped cross-section orthogonal to the axial direction, and extends by a length approximately equal to a half of the length of the permanent magnet 14c in the axial direction. Similarly to the first core 16b, each second core 16c is formed by laminating a plurality of steel plates such that it has a generally sector-shaped cross-section orthogonal to the axial direction, and extends by a length approximately equal to a half of the length of the permanent magnet 14c in the axial direction.

Further, the first cores 16b are each axially arranged between the left portion of the first rotor 14 (on the first magnetic pole side) and the left portion of the stator 15 (on the first armature magnetic pole side), and the second cores 16c are each axially arranged between the right portion of the first rotor 14 (on the second magnetic pole side) and the right portion of the stator 15 (on the second armature magnetic pole side). Furthermore, the second cores 16c are circumferentially alternately arranged with respect to the first cores 16b, and the center of each second core 16c is displaced by a half of the aforementioned predetermined angle θ from the center of the corresponding first core 16b (see FIG. 5).

In the first rotating machine 10 configured as above, as shown in FIG. 5, during generation of the first and second rotating magnetic fields, when the polarity of each first armature magnetic pole is different from the polarity of an opposed (closest) one of the first magnetic poles, the polarity of each second armature magnetic pole is the same as the polarity of an opposed (closest) one of the second magnetic poles. Further, when each first core 16b is in a position between each first magnetic pole and each first armature magnetic pole, each second core 16c is in a position between a pair of second armature magnetic poles circumferentially adjacent to each other and a pair of second magnetic poles circumferentially adjacent to each other. Furthermore, although not shown, during generation of the first and second rotating magnetic fields, when the polarity of each second armature magnetic pole is different from the polarity of an opposed (closest) one of the second magnetic poles, the polarity of each first armature magnetic pole is the same as the polarity of an opposed (closest) one of the first magnetic poles. Further, when each second core 16c is in a position between each second magnetic pole and each second armature magnetic pole, each first core 16b is in a position between a pair of first armature magnetic poles circumferentially adjacent to each other, and a pair of first magnetic poles circumferentially adjacent to each other.

Figure 6:
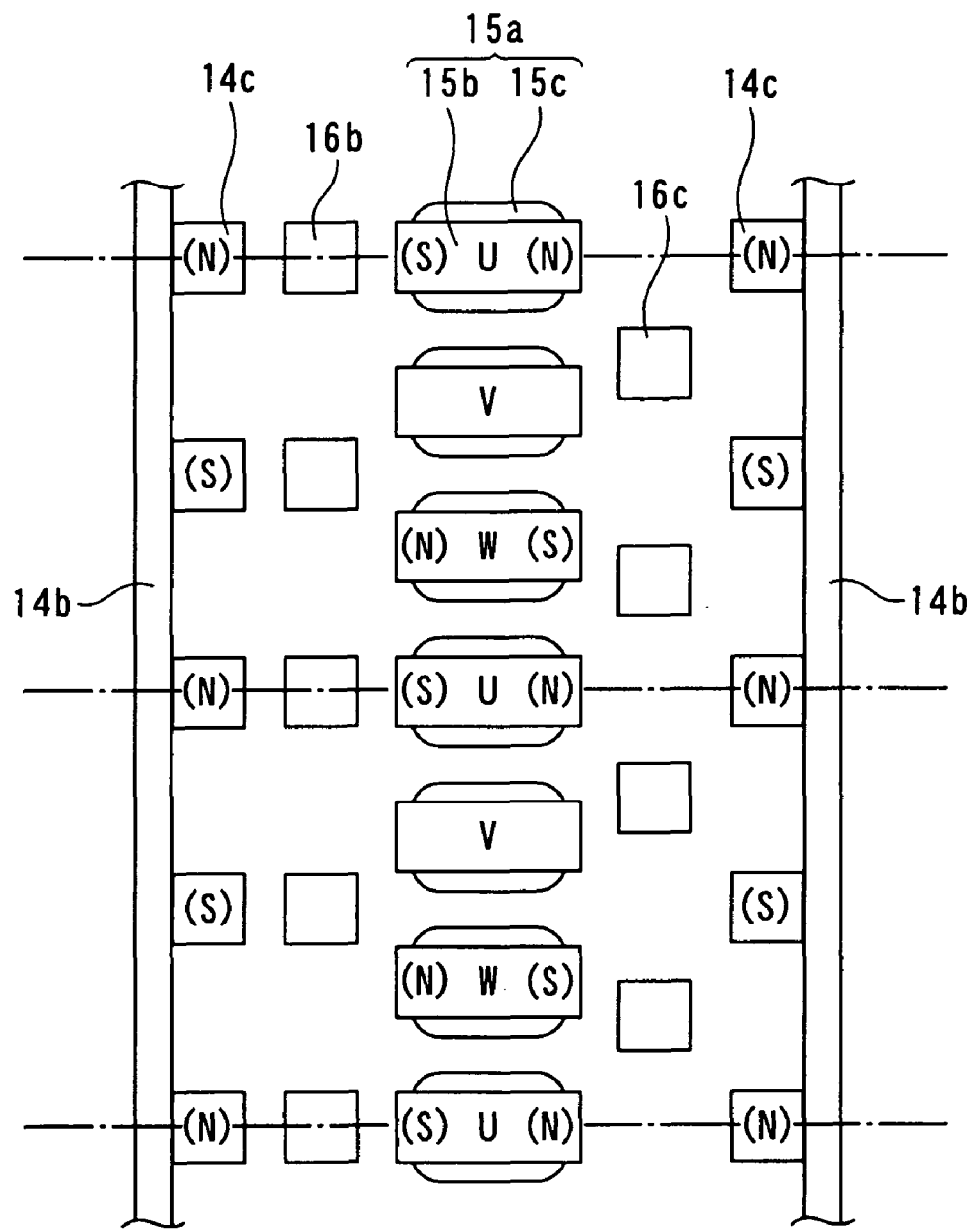
FIG. 6 is a diagram showing an arrangement functionally equivalent to the arrangement of the FIG. 5 development view.

The first rotating machine 10 can be also regarded as a planetary gear unit which inputs and outputs torque by the first and second rotors 14 and 16, and inputs and outputs electric power by the stator 15. The following description is given of this point based on the operation of the first rotating machine 10. It should be noted that although in FIG. 5, the armatures 15a and the fixing portion 15e are shown as if they were divided into two other parts since FIG. 5 is shown as a development view, actually, they are integrally formed with each other, so that the arrangement in FIG. 5 can be shown as in FIG. 6 as equivalent thereto. Therefore, hereinafter, the operation of the first rotating machine 10 is described assuming that the permanent magnets 14c, the armatures 15a, and the first and second cores 16b and 16c are arranged as shown in FIG. 6.

Further, for convenience of description, the operation of the first rotating machine 10 is described by replacing the motion of the first and second rotating magnetic fields by an equivalent physical motion of 2 n imaginary permanent magnets (hereinafter referred to as "the imaginary magnets") VM, equal in number to the permanent magnets 14c. Further, the description will be given assuming that a magnetic pole at a left-side portion of each imaginary magnet VM (on the first magnetic pole side), and a magnetic pole at a right-side portion of the imaginary magnet VM (on the second magnetic pole side) are regarded as first and second armature magnetic poles, respectively, and that rotating magnetic fields generated between the left-side portion of the imaginary magnet VM and the left portion of the first rotor 14 (on the first magnetic pole side), and between the right-side portion of the imaginary magnet VM and the right portion of the first rotor 14 (on the second magnetic pole side) are regarded as first and second rotating magnetic fields. Furthermore, hereinafter, the left-side portion and the right-side portion of the permanent magnet 14c are referred to as "the first magnet portion" and "the second magnet portion".

First, a description will be given of the operation of the first rotating machine 10 in a state where the first rotor 14 is made unrotatable, and the first and second rotating magnetic fields are generated by the supply of electric power to the stator 15.

Figure 7A:
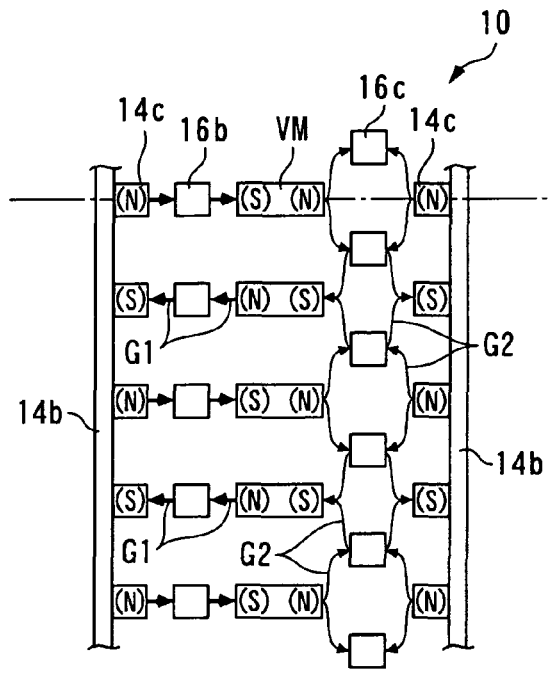
FIGS. 7A to 7D are diagrams illustrating the operation of the first rotating machine in the case where the first and second rotating magnetic fields are generated while holding a first rotor unrotatable.

As shown in FIG. 7A, the first and second rotating magnetic fields are generated in a manner rotated downward, as viewed in the figure, from a state in which each first core 16b is opposed to each first magnet portion, and each second core 16c is in a position between each adjacent two of the second magnet portions. At the start of the generation of the first and second rotating magnetic fields, the polarity of each first armature magnetic pole is made different from the polarity of each opposed one of the first magnetic poles, and the polarity of each second armature magnetic pole is made the same as the polarity of each opposed one of the second magnetic poles.

Since the first cores 16b are disposed as described above, they are magnetized by the first magnetic poles and the first armature magnetic poles, and magnetic lines G1 of force (hereinafter referred to as "the first magnetic lines G1") are generated between the first magnetic poles, the first cores 16b, and the first armature magnetic poles. Similarly, since the second cores 16c are disposed as described above, they are magnetized by the second armature magnetic poles and the second magnetic poles, and magnetic lines G2 of force (hereinafter referred to as "the second magnetic lines G2") are generated between the second armature magnetic poles, the second cores 16c, and the second magnetic poles.

Figure 9A:
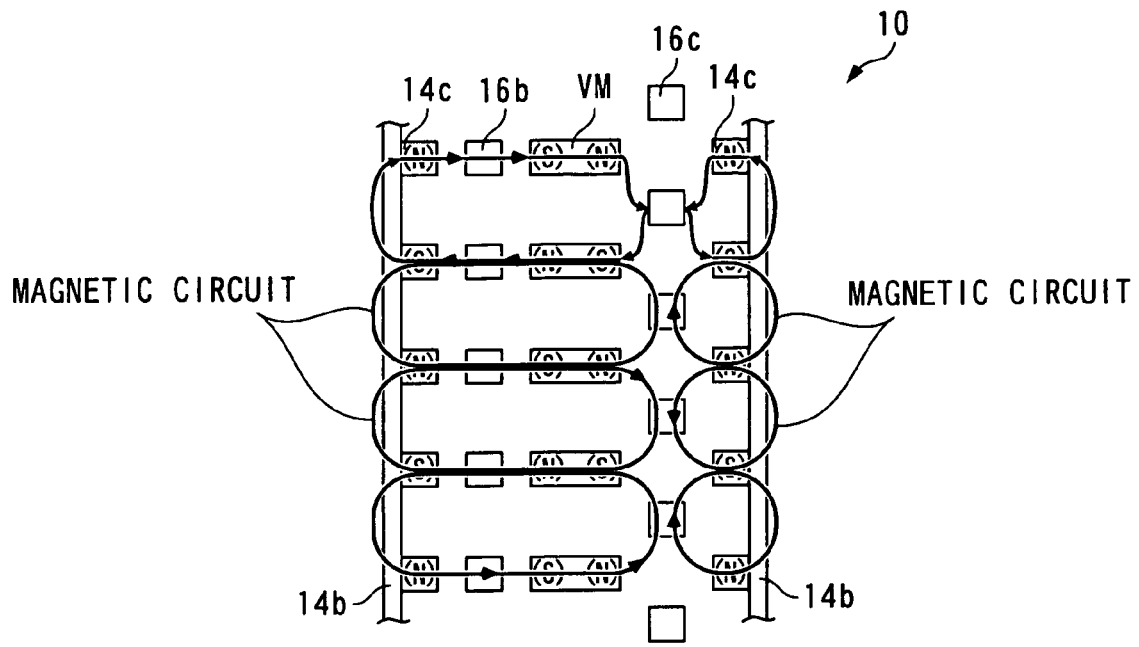
FIGS. 9A and 9B are diagrams each showing magnetic circuits formed when the first rotating machine is in operation.

In the state shown in FIG. 7A, the first magnetic lines G1 are generated such that they each connect the first magnetic pole, the first core 16b, and the first armature magnetic pole, and the second magnetic lines G2 are generated such that they connect each circumferentially adjacent two second armature magnetic poles and the second core 16c located therebetween, and connect each circumferentially adjacent two second magnetic poles and the second core 16c located therebetween. As a result, in this state, magnetic circuits as shown in FIG. 9A are formed. In this state, since the first magnetic lines G1 are linear, no magnetic forces for circumferentially rotating the first cores 16b act on the first cores 16b. Further, the two second magnetic lines G2 between the circumferentially adjacent two second armature magnetic poles and the second core 16c are equal to each other in the degree of bend thereof and in the total magnetic flux amount. Similarly, the two second magnetic lines G2 between the circumferentially adjacent two second magnetic poles and the second core 16c are equal to each other in the degree of bend thereof and in the total magnetic flux amount. As a consequence, the second magnetic lines G2 are balanced. Therefore, no magnetic forces for circumferentially rotating the second cores 16c act on the second cores 16c, either.

Figure 7B:
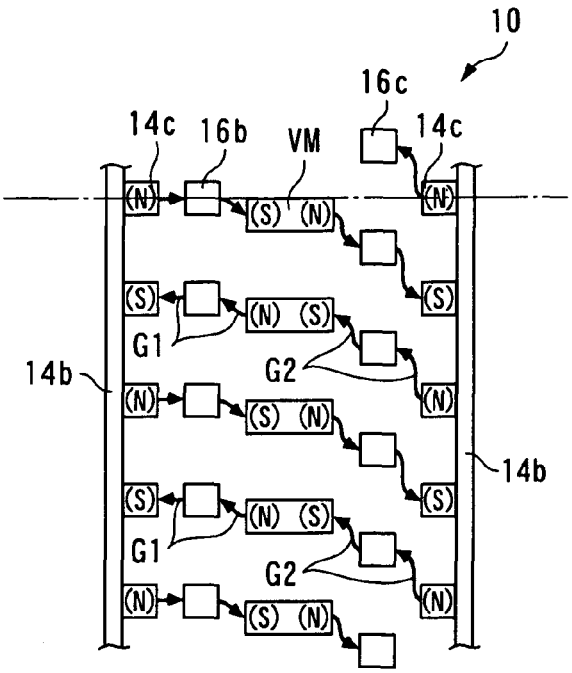
Figure 7C:
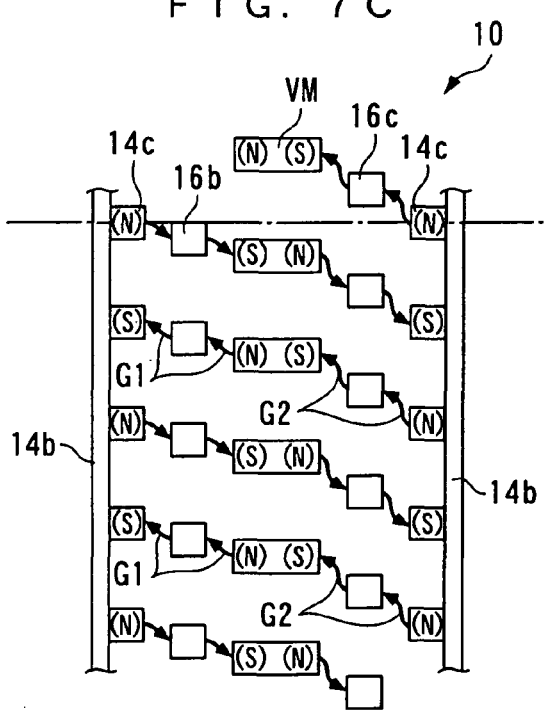
Figure 7D:
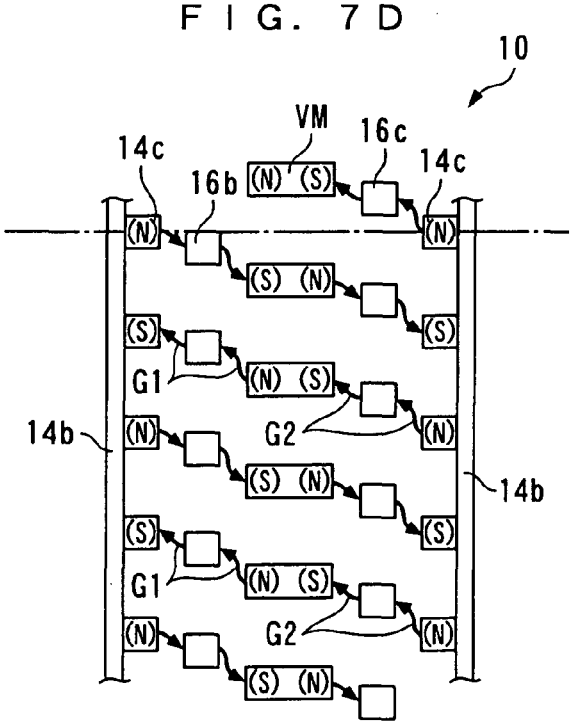
Figure 9B:
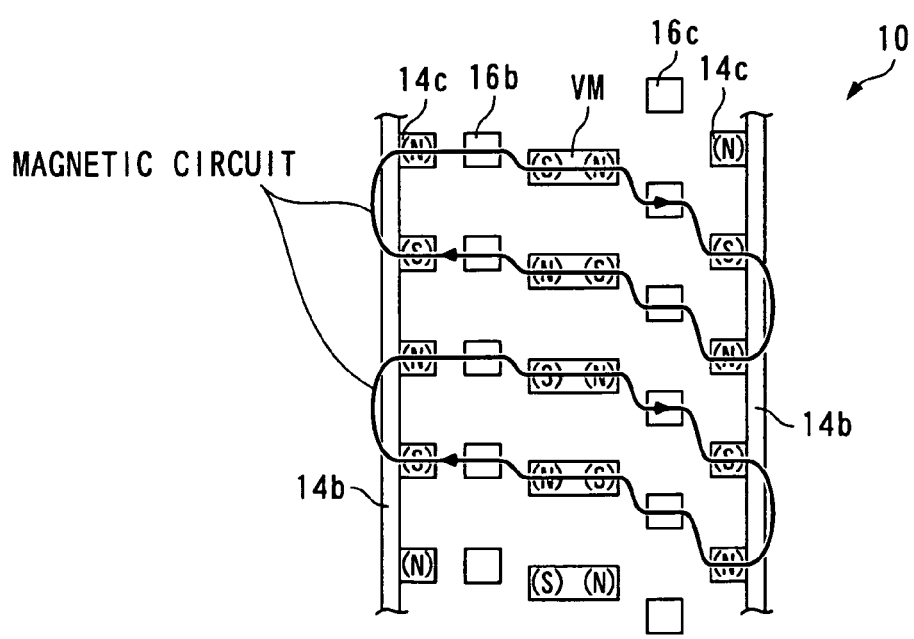

When the imaginary magnets VM rotate from a position shown in FIG. 7A to a position shown in FIG. 7B, the second magnetic lines G2 are generated such that they each connect between the second armature magnetic pole, the second core 16c, and the second magnetic pole, and the first magnetic lines G1 between the first cores 16b and the first armature magnetic poles are bent. As a result, magnetic circuits are formed by the first magnetic lines G1 and the second magnetic lines G2, as shown in FIG. 9B.

In this state, since the degree of bend of each first magnetic line G1 is small but the total magnetic flux amount thereof is large, a relatively large magnetic force acts on the first core 16b. This causes the first cores 16b to be driven by relatively large driving forces in the direction of rotation of the imaginary magnets VM, that is, the direction of rotation of the first and second magnetic fields (hereinafter referred to "the magnetic field rotation direction"), whereby the second rotor 16 rotates in the magnetic field rotation direction. Further, since the degree of bend of the second magnetic line G2 is large but the total magnetic flux amount thereof is small, a relatively small magnetic force acts on the second core 16c. This causes the second cores 16c to be driven by relatively small driving forces in the magnetic field rotation direction, whereby the second rotor 16 rotates in the magnetic field rotation direction.

Then, when the imaginary magnets VM rotate from the position shown in FIG. 7B to respective positions shown in FIGS. 7C and 7D, and FIGS. 8A and 8B, in the mentioned order, the first and second cores 16b and 16c are driven in the magnetic field rotation direction by magnetic forces caused by the first and second magnetic lines G1 and G2, whereby the second rotor 16 is caused to rotate in the magnetic field rotation direction. During the time, the first magnetic lines G1 increase in the degree of bend thereof but decrease in the total magnetic flux amount thereof, whereby the magnetic forces acting on the first cores 16b progressively decrease to progressively reduce the driving forces for driving the first cores 16b in the magnetic field rotation direction. Further, the second magnetic lines G2 decrease in the degree of bend thereof but increase in the total magnetic flux amount thereof, whereby the magnetic forces acting on the second cores 16c progressively increase to progressively increase the driving forces for driving the second cores 16c in the magnetic field rotation direction.

Figure 8A:
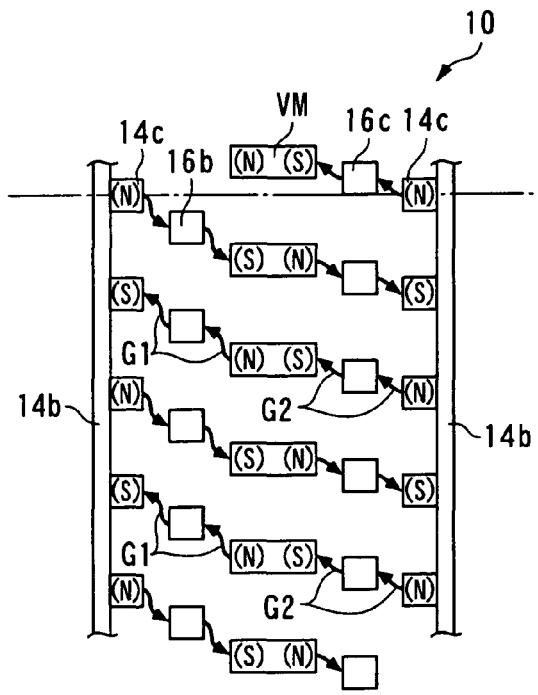
FIGS. 8A to 8C are diagrams illustrating a continuation of the operation in FIGS. 7A to 7D.
Figure 8B:
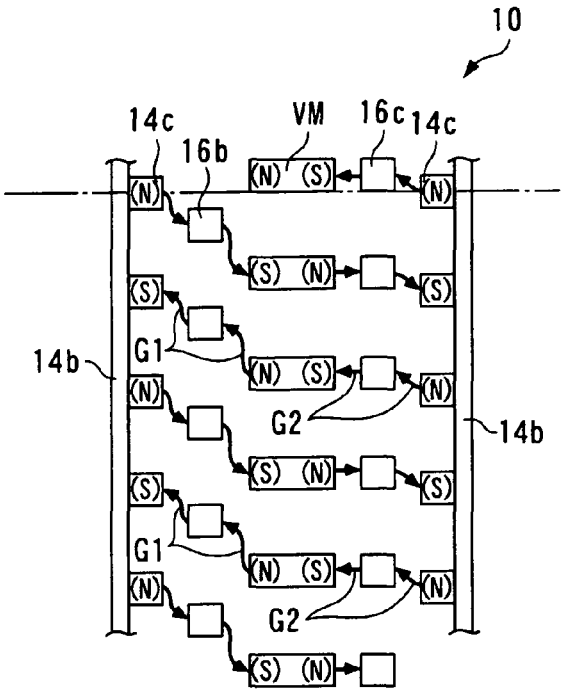
Figure 8C:
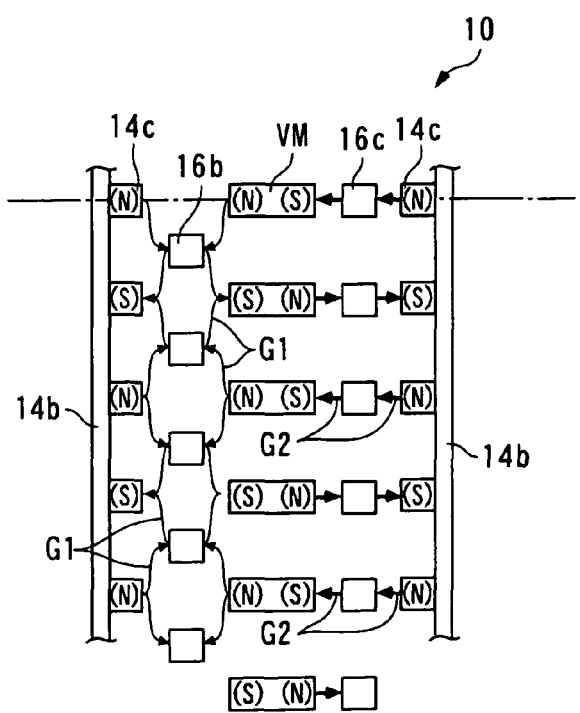

Then, while the imaginary magnets VM rotate from the position shown in FIG. 8B to the position shown FIG. 8C, the second magnetic lines G2 are bent, and the total magnetic flux amounts thereof become close to their maximum, whereby the strongest magnetic forces are caused to act on the second cores 16c to maximize the driving forces acting on the second cores 16c. After that, as shown in FIG. 8C, when the imaginary magnets VM each move to a position opposed to the first and second magnet portions, the respective polarities of the first armature magnetic pole and the first magnetic pole opposed to each other become identical to each other, and the first core 16b is positioned between circumferentially adjacent two pairs of first armature magnetic poles and first magnetic poles, each pair having the same polarity. In this state, since the degree of bend of the first magnetic line G1 is large but the total magnetic flux amount thereof is small, no magnetic force for rotating the first core 16b in the magnetic field rotation direction acts on the first core 16b. Further, second armature magnetic poles and second magnetic poles opposed to each other come to have polarities different from each other.

From this state, when the imaginary magnets VM further rotate, the first and second cores 16b and 16c are driven in the magnetic field rotation direction by the magnetic forces caused by the first and second magnetic lines G1 and G2, whereby the second rotor 16 rotates in the magnetic field rotation direction. At this time, while the imaginary magnets VM rotate to the position shown FIG. 7A, inversely to the above, since the first magnetic lines G1 decrease in the degree of bend thereof but increase in the total magnetic flux amount thereof, the magnetic forces acting on the first cores 16b increase to increase the driving forces acing on the first cores 16b. On the other hand, since the second magnetic lines G2 increase in the degree of bend thereof but decrease in the total magnetic flux amount thereof, the magnetic forces acting on the second cores 16c decrease to reduce the driving force acing on the second core 16c.

Figure 10:
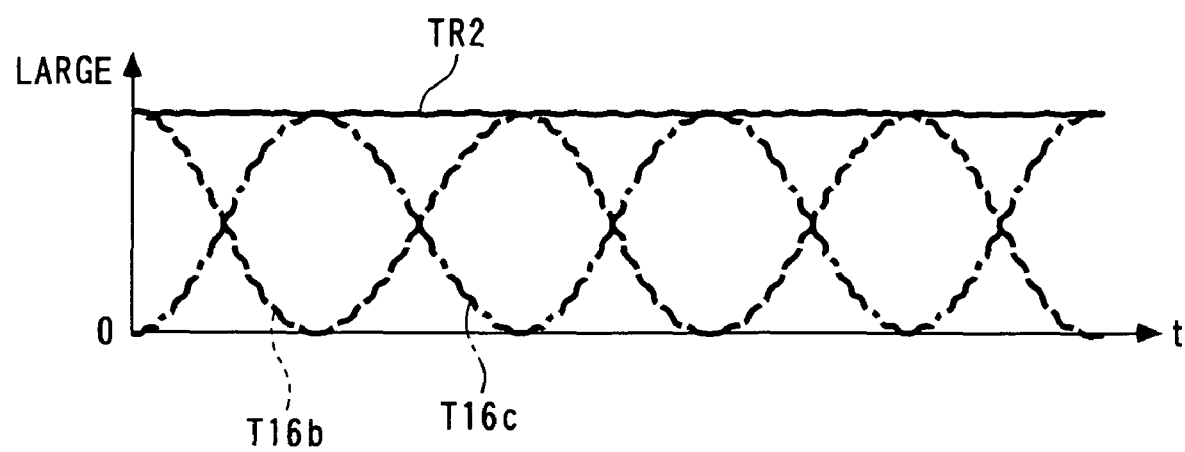
FIG. 10 is a schematic diagram illustrating torque transmitted to a second rotor when the first and second rotating magnetic fields are generated while holding the first rotor unrotatable.

As described above, the second rotor 16 rotates in the magnetic field rotation direction, while the driving forces acting on the respective first and second core 16b and 16c repeatedly increase and decrease by turns in accordance with the rotations of the imaginary magnets VM, that is, the rotations of the first and second rotating magnetic fields. In this case, assuming that the torques transmitted via the first and second cores 16b and 16c are denoted by T16b and T16c, the relationship between the torque TR2 transmitted to the second rotor 16 (hereinafter referred to as "the second rotor transmission torque"), and the two torques T16b and T16c is as shown generally in FIG. 10. As shown in the figure, the two torques T16b and T16c change approximately sinusoidally at the same repetition period, and phases thereof are displaced from each other by a half period. Further, since the second rotor 16 has the first and second core 16b and 16c connected thereto, the second rotor transmission torque TR2 is equal to the sum of the two torques T16b and T16c that change as described above, and becomes approximately constant.

Further, the magnetic forces produced according to the first and second magnetic lines G1 and G2 act to cause the second rotor 16 to rotate while maintaining a state in which the first cores 16b are positioned at intermediate locations between the first magnetic poles and the first armature magnetic poles connected by the first magnetic lines G1, and at the same time the second cores 16c are positioned at intermediate locations between the second magnetic poles and the second armature magnetic poles connected by the second magnetic lines G2. Therefore, between the rotational speed NMF of the first and second rotating magnetic fields (hereinafter referred to as "the magnetic field rotational speed"), the rotational speed NR1 of the first rotor 14 (hereinafter referred to as "the first rotor rotational speed"), and the rotational speed NR2 of the second rotor 16 (hereinafter referred to as "the second rotor rotational speed"), there holds the following equation (1):

$$NR2=(NMF+NR1)/2 \tag{1}$$

By changing the equation (1), there is obtained the following equation (2):

$$NMF-NR2=NR2-NR1 \tag{2}$$

As is clear from these equations (1) and (2), the second rotor rotational speed NR2 is equal to the average speed of the magnetic field rotational speed NMF and the first rotor rotational speed NR1. In other words, the difference between the magnetic field rotational speed NMF and the second rotor rotational speed NR2 is equal to the difference between the second rotor rotational speed NR2 and the first rotor rotational speed NR1. Thus, the magnetic field rotational speed NMF, the first rotor rotational speed NR1, and the second rotor rotational speeds NR2 are in a collinear relationship.

Figure 11A:
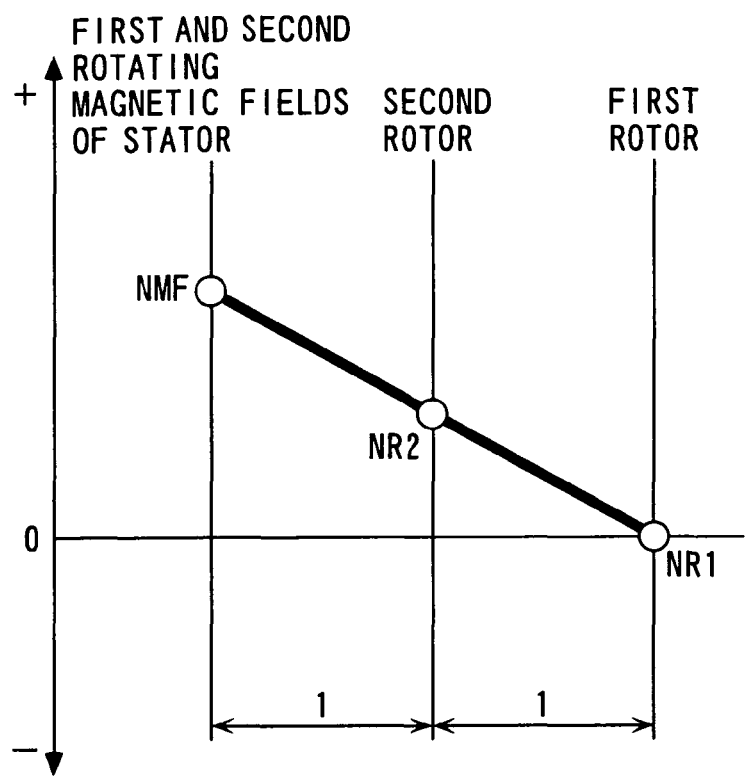
FIG. 11A is a collinear chart illustrating an example of the relationship between a magnetic field rotational speed and first and second rotor rotational speeds, in the case of the first rotor being made unrotatable.

As described above, when the aforementioned first rotor rotational speed NR1 is equal to 0, NR2=NMF/2 holds, and a collinear chart representing the relationship between the magnetic field rotational speed NMF, the first rotor rotational speed NR1, and the second rotor rotational speed NR2 can be expressed as shown in FIG. 11A. As mentioned above, since the difference between the magnetic field rotational speed NMF and the second rotor rotational speed NR2 is equal to the difference between the second rotor rotational speed NR2 and the first rotor rotational speed NR1, in the collinear chart shown in FIG. 11A, a ratio between the distance between the first and second rotating magnetic fields and the first rotor 14, and the distance between the first rotor 14 and the second rotor 16 is 1:1. This is also the case with the other collinear charts expressing the relationships between the magnetic field rotational speed NMF, the first rotor rotational speed NR1, and the second rotor rotational speed NR2.

Further, in this case, the second rotor rotational speed NR2 is reduced to ½ of the magnetic field rotational speed NMF, and hence, assuming that torque equivalent to the power supplied to the stator 15 and the magnetic field rotational speed NMF is a driving equivalent torque TSE, the second rotor transmission torque TR2 becomes a twofold of the driving equivalent torque TSE. In short, there holds the following equation (3):

$$TR2 = 2 \cdot TSE \quad (3)$$

As described above, when the electric power is supplied to the stator 15 in a state where the first rotor 14 is made unrotatable, all the electric power is transmitted to the second rotor 16 as (kinetic) power.

Next, a description will be given of an operation in the case where the first and second rotating magnetic fields are generated by the power supplied to the stator 15, with the second rotor 16 made unrotatable.

Figure 13A:
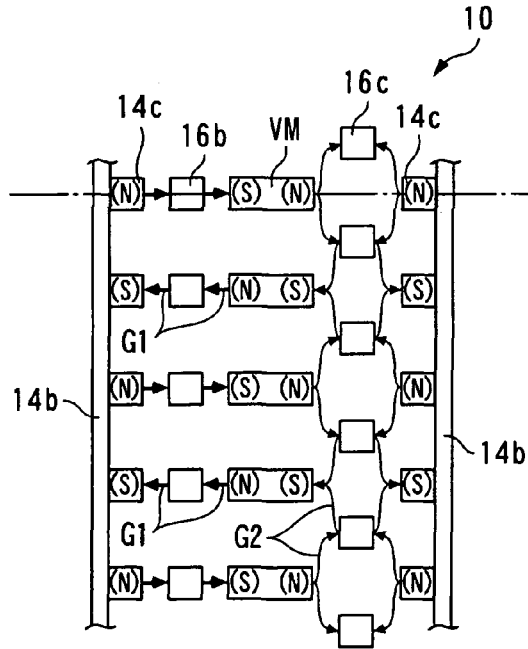
FIGS. 13A to 13D are diagrams illustrating the operation of the first rotating machine when the first and second rotating magnetic fields are generated while holding the second rotor unrotatable.

In this case as well, as shown in FIG. 13A, the first and second rotating magnetic fields are generated in a manner rotated downward, as viewed in the figure, from a state in which each first core 16*b* is opposed to each first magnet portion, and each second core 16*c* is in a position between each adjacent two of the second magnet portions. At the start of the generation of the first and second rotating magnetic fields, the polarity of each first armature magnetic pole is made different from the polarity of an opposed one of the first magnetic poles, and the polarity of each second armature magnetic pole is made the same as the polarity of an opposed one of the second magnetic poles. In this state, magnetic circuits as shown in FIG. 9A are formed.

Figure 13B:
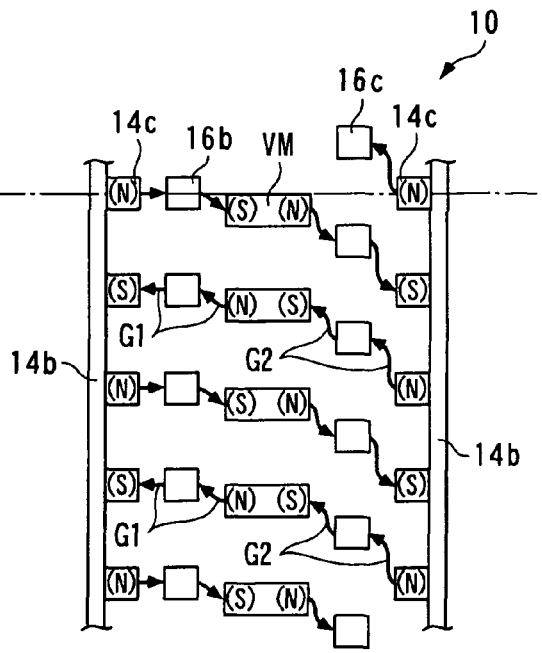

Then, when the imaginary magnets VM rotate from a position shown in FIG. 13A to a position shown in FIG. 13B, the first magnetic lines G1 between the first cores 16*b* and the first armature magnetic poles are bent, and accordingly, the second armature magnetic poles becomes closer to the second cores 16*c*, whereby the second magnetic lines G2 connecting between the second armature magnetic poles, the second cores 16*c* and the second magnetic poles are generated. As a consequence, magnetic circuits as shown in FIG. 9B are formed.

In this state, although the total magnetic flux amounts of the first magnetic lines G1 between the first magnetic poles and the first cores 16*b* are large, the first magnetic lines G1 are straight, and hence no magnetic forces are generated which cause the first magnet portions to rotate with respect to the first cores 16*b*. Further, although the distance between each second magnetic pole and a second armature magnetic poles having a polarity different from that of the second magnetic pole is relatively large to make the total magnetic flux amounts of the second magnetic lines G2 between the second cores 16*c* and the second magnetic poles relatively small, the degree of bend of the second magnetic lines G2 is large, whereby magnetic forces that make the second magnet portions closer to the second cores 16*c* are caused to act on the second magnet portions. This causes the permanent magnets 14*c* to be driven in the direction of rotation of the imaginary magnets VM, that is, in a direction (upward, as viewed in FIG. 13) opposite to the direction of rotations of the magnetic field rotation direction, and be rotated toward a position shown in FIG. 13C. In accordance with this, the first rotors 14 rotate in an direction opposite to the magnetic field rotation direction.

Figure 13C:
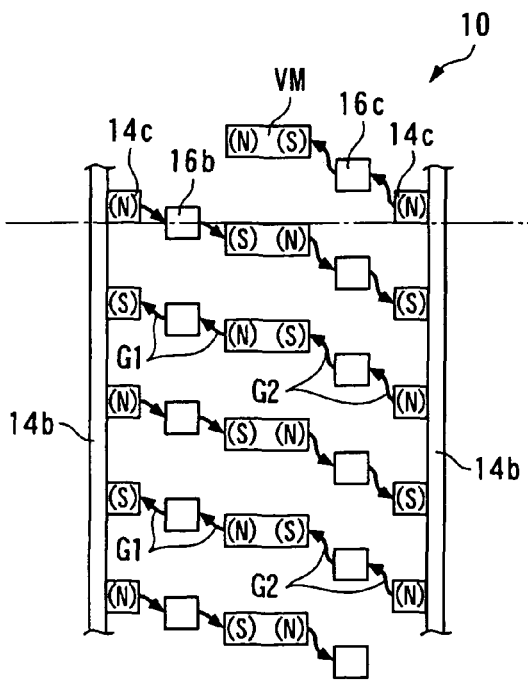
Figure 13D:
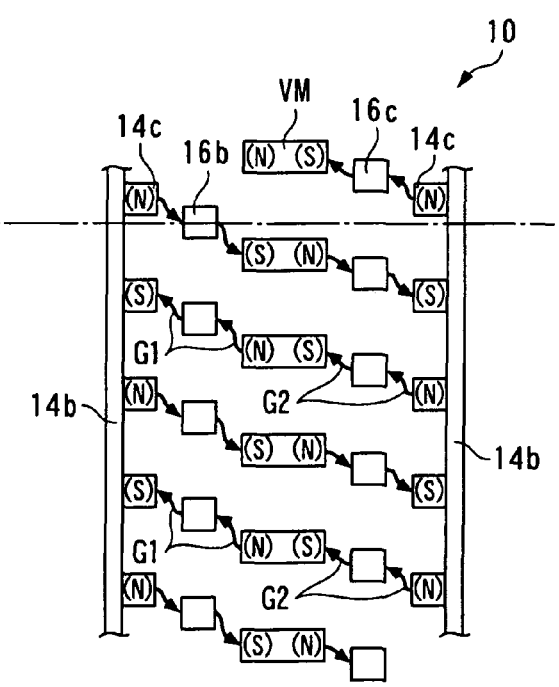

While the permanent magnets 14*c* rotate from the position shown in FIG. 13B toward the position shown in FIG. 13C, the imaginary magnets VM rotate toward a position shown in FIG. 13D. Thus, although the second magnet portions become closer to the second cores 16*c* to make the degree of bend of the second magnetic lines G2 between the second cores 16*c* and the second magnetic poles smaller, the imaginary magnets VM become further closer to the second cores 16*c*, which increases the total magnetic flux amounts of the second magnetic lines G2. As a result, in this case as well, the magnetic forces that make the second magnet portions closer to the second cores 16*c* act on the second magnet portions, whereby the permanent magnets 14*c* are driven in the direction opposite to the magnetic field rotation direction.

Further, as the permanent magnets 14*c* rotate in the direction opposite to the magnetic field rotation direction, the first magnetic lines G1 between the first magnetic poles and the first cores 16*b* are bent along with the rotation of the permanent magnets 14*c*, whereby magnetic forces that make the first magnet portions closer to the first cores 16*b* act on the first magnet portions. In this state, however, magnetic forces caused by the first magnetic lines G1 are smaller than the aforementioned magnetic forces caused by the second magnetic lines G2, since the degree of bend of the first magnetic lines G1 is smaller than that of the second magnetic lines G2. As a result, magnetic forces corresponding to the differences between the two magnetic forces drives the permanent magnets 14*c* in the direction opposite to the magnetic field rotation direction.

Referring to FIG. 13D, when the distance between the first magnetic poles and the first cores 16*b*, and the distance between the second cores 16*c* and the second magnetic poles have become approximately equal to each other, the total magnetic flux amount and the degree of bend of the first magnetic lines G1 between the first magnetic pole and the first core 16*b* become approximately equal to the total magnetic flux amount and the degree of bend of the second magnetic lines G2 between the second core 16*c* and the second magnetic pole, respectively. As a result, the magnetic forces caused by the first and second magnetic lines G1 and G2 are approximately balanced, whereby the permanent magnets 14*c* are temporarily placed in an undriven state.

Figure 14A:
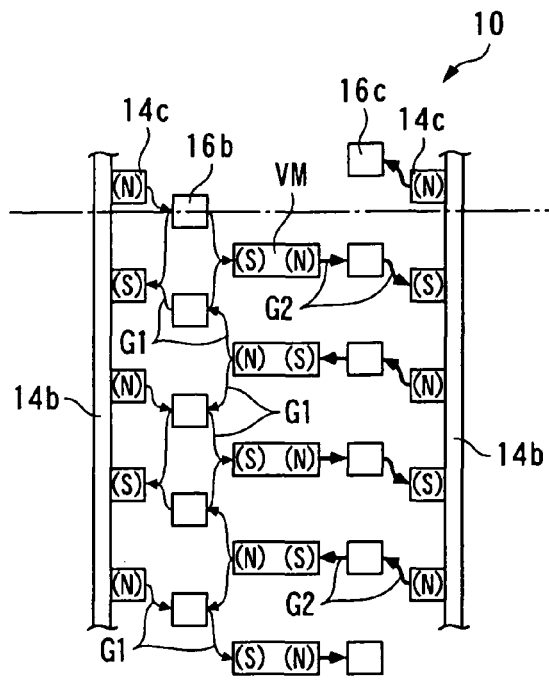
FIGS. 14A to 14C are diagrams showing a continuation of the operation in FIGS. 13A to 13D.
Figure 14B:
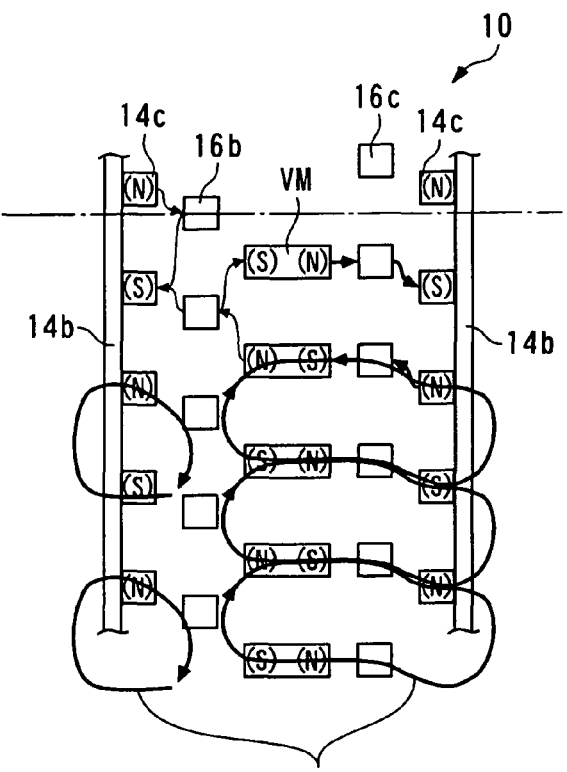

From this state, when the imaginary magnets VM rotate to a position shown in FIG. 14A, the state of generation of the first magnetic lines G1 is changed to form magnetic circuits as shown in FIG. 14B. Accordingly, the magnetic forces caused by the first magnetic lines G1 almost cease to act on the first magnet portions such that the magnetic forces make the first magnet portions closer to the first cores 16*b*, and therefore the permanent magnets 14*c* are driven by the magnetic forces caused by the second magnetic lines G2, to a position shown in FIG. 14C, in the direction opposite to the magnetic field rotation direction.

Figure 14C:
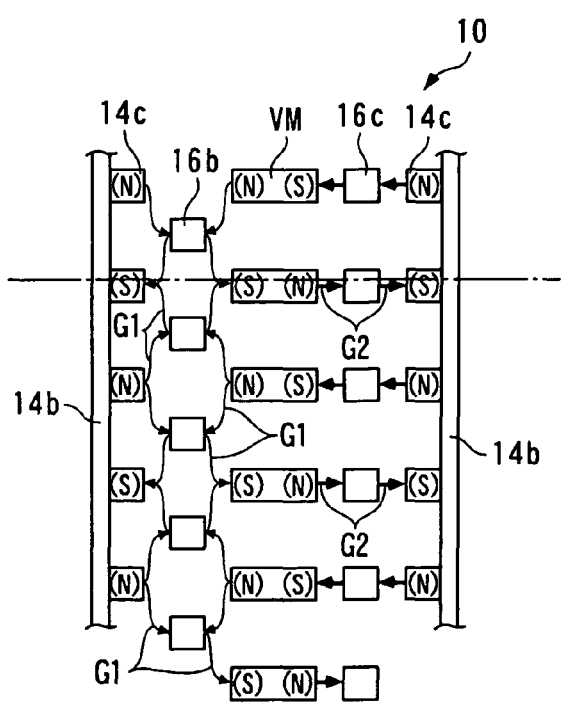

Then, when the imaginary magnets VM slightly rotate from the position shown in FIG. 14C, inversely to the above, the magnetic forces caused by the first magnetic lines G1 between the first magnetic poles and the first cores 16*b* act on the first magnet portions such that the magnetic forces make the first magnet portions closer to the first cores 16*b*, whereby the permanent magnets 14*c* are driven in the direction opposite to the magnetic field rotation direction, to rotate the first rotor 14 in the direction opposite to the magnetic field rotation direction. Then, when the imaginary magnets VM further rotate, the permanent magnets 14*c* are driven in the direction opposite to the magnetic field rotation direction, by respective magnetic forces corresponding to the differences between the magnetic forces caused by the first magnetic lines G1 between the first magnetic poles and the first cores 16*b*, and the magnetic forces caused by the second magnetic lines G2 between the second cores 16*c* and the second magnetic poles. After that, when the magnetic forces caused by the second magnetic lines G2 almost cease to act on the second magnet portions such that the magnetic force makes the second magnet portions closer to the second cores 16*c*, the permanent magnets 14*c* are driven by the magnetic forces caused by the first magnetic lines G1 in the direction opposite to the magnetic field rotation direction.

As described hereinabove, in accordance with the rotations of the first and second rotating magnetic fields, the magnetic forces caused by the first magnetic lines G1 between the first magnetic poles and the first cores 16*b*, the magnetic forces caused by the second magnetic lines G2 between the second cores 16*c* and the second magnetic poles, and the magnetic forces corresponding to the differences between the above magnetic forces alternately act on the permanent magnets 14*c*, i.e. on the first rotor 14, whereby the first rotor 14 is rotated in the direction opposite to the magnetic field rotation direction. Further, the magnetic forces, that is, the driving forces thus act on the first rotor 14 alternately, whereby the torque TR1 transmitted to the first rotor 14 (hereinafter referred to as "the first rotor transmission torque") is made approximately constant.

Figure 11B:
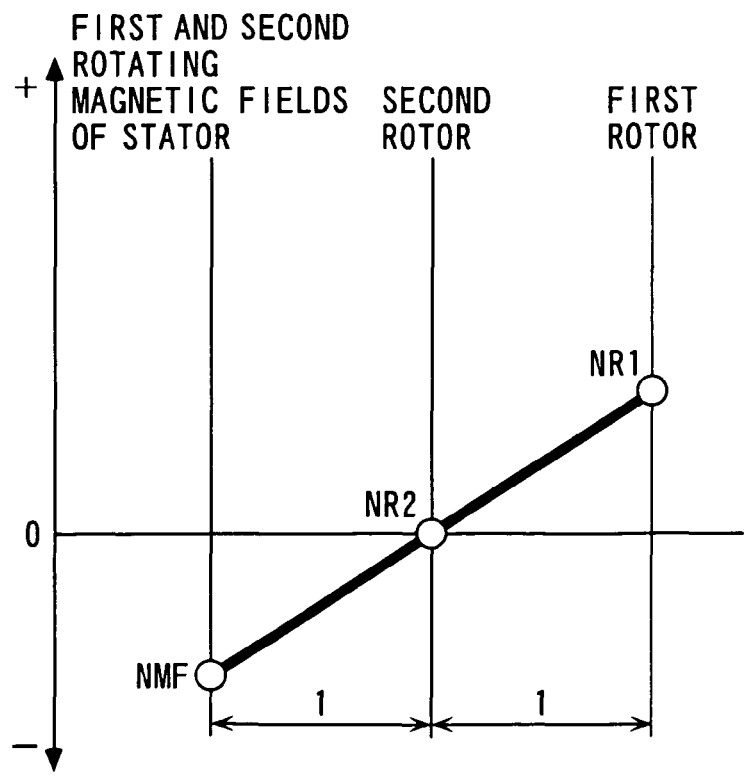
FIG. 11B is a collinear chart illustrating an example of the relationship between the magnetic field rotational speed and the first and second rotor rotational speeds, in the case of the second rotor being made unrotatable.

Further, the relationship between the magnetic field rotational speed NMF at this time and the rotational speeds NR1 and NR2 of the first and second rotors can be expressed as NR1=−NMF by setting NR2=0 in the aforementioned equation (1), and is shown, e.g. as in FIG. 11B. Thus, the first rotor 14 rotates in the reverse direction at the same speed as that of the first and second rotating magnetic fields. Further, in this case, the first rotor transmission torque TR1 becomes equal to the driving equivalent torque TSE, and there holds the following equation (4):

$$TR1 = TSE \qquad (4)$$

Figure 12A:
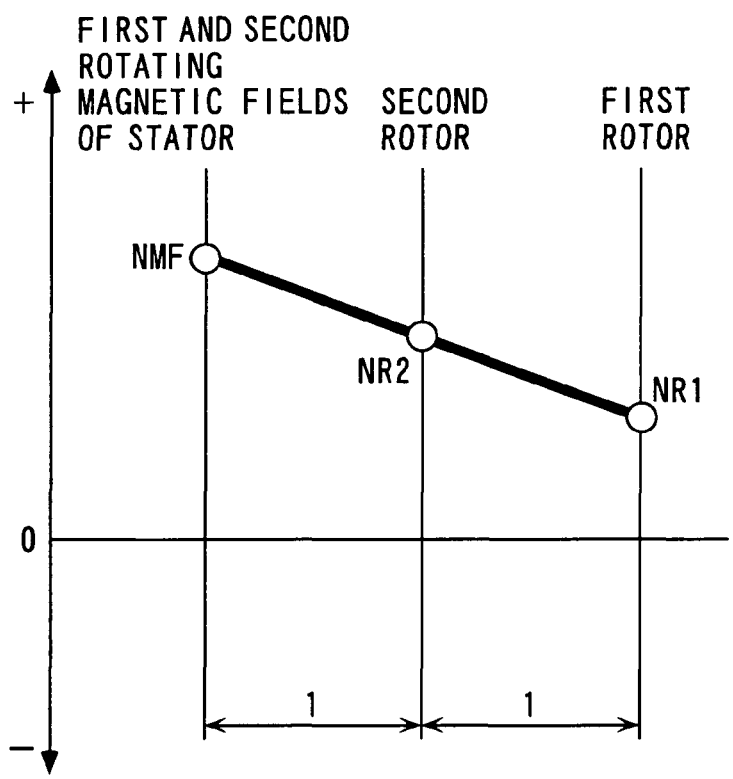
FIG. 12A is a collinear chart illustrating an example of the relationship between the magnetic field rotational speed and the first and second rotor rotational speeds, in the case of both the first and second rotors being rotating.

Further, if none of the magnetic field rotational speed NMF and the first and second rotor rotational speeds NR1 and NR2 are equal to 0, e.g. if the first and second rotating magnetic fields are generated in a state in which the first and/or second rotors 14 and 16 are caused to rotate by inputting power thereto, the relationship between the magnetic field rotational speed NMF, the first rotor rotational speed NR1, and the second rotor rotational speed NR2 of the aforementioned general formula (1) is satisfied as it is and the speed relationship between the three is expressed as shown in FIG. 12A.

Further, when the magnetic field rotational speed NMF is controlled to 0 e.g. by causing lock current to flow through the armatures 15*a* or performing correlation short-circuit control in the first rotating machine 10, and the second rotor 16 is rotated by power, the power (energy) input to the second rotor 16 is not transmitted to the stator 15, but is all transmitted to the first rotor 14 via the magnetic forces caused by the first and second magnetic lines G1 and G2. Similarly, when the first rotor 14 are caused to rotate by power, and the magnetic field rotational speed NMF is controlled to 0, the power (energy) input to the first rotor 14 is not transmitted to the stator 15 but all transmitted to the second rotor 16 via the magnetic forces caused by the first and second magnetic lines G1 and G2.

Figure 12B:
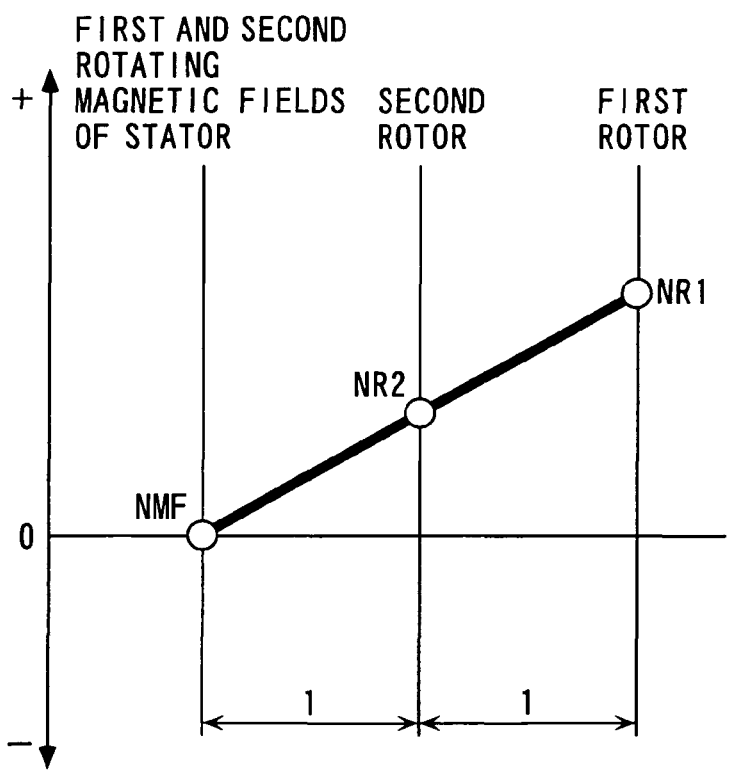
FIG. 12B is a collinear chart illustrating an example of the relationship between the magnetic field rotational speed and the first and second rotor rotational speeds, in the case of the magnetic field rotational speed being equal to 0.

Further, the relationship between the magnetic field rotational speed NMF, the first rotor rotational speed NR1, and the second rotor rotational speed NR2 is expressed as NR1=2·NR2 by setting NMF=0 in the aforementioned equation (1), and is expressed, e.g. as shown in FIG. 12B. Further, the relationship between the first and second rotor transmitting torques TR1 and TR2 satisfy the following equation (5):

$$TR1 = TR2/2 \qquad (5)$$

Further, in the first rotating machine 10, even in the case of electric power being not supplied to the stator 15, if with respect to the armatures 15*a*, the permanent magnets 14*c* are rotated by input of power to the first rotor 14 or the first and second cores 16*b* and 16*c* are rotated by input of power to the second rotor 16, induced electric motive force is generated in the armatures 15*a* to generate electric power. If the first and second magnetic rotating fields are generated in accordance with this electric power generation, the aforementioned equation (1) holds.

Further, between the magnetic field rotational speed NMF, the first rotor rotational speed NR1, and the second rotor rotational speed NR2, the relationship as expressed by the aforementioned equations (1) and (2) and FIGS. 11A, 11B, and 12A, 12B is always satisfied, and the speed relationship between the three corresponds to the speed relationship between one and the other of the ring gear and sun gear of the planetary gear unit, and the carrier supporting the planetary gears. Further, such a speed relationship is obtained not only during the supply of electric power to the stator 15, but also during the generation of electric power, and hence the first rotating machine 10 can be regarded as a planetary gear unit which inputs and outputs torque by the first and second rotors 14 and 16 and inputs and outputs electric power by the stator 15.

Further, if power is input to the second rotor 16 and at the same time, the power generation is performed by the stator 15 using the power, assuming that torque equivalent to the electric power generated by the stator 15 and the magnetic field rotational speed NMF is defined as the electric power-generating equivalent torque TGE, the relationship between the electric power-generating equivalent torque TGE, and the first rotor transmission torque TR1, and the second rotor transmitting torque TR2 satisfy the following equation (6):

$$TR2 = TGE + TR1 \qquad (6)$$

In this case, as is clear from the equation (6), the second rotor transmitting torque TR2 is divided and is output as the electric power-generating equivalent torque TGE and the first rotor transmission torque TR1. Further, as shown in the aforementioned equation (2), the difference between the magnetic field rotational speed NMF and the second rotor rotational speed NR2 and the difference between the second rotor rotational speed NR2 and the first rotor rotational speed NR1 are equal to each other, and hence the torque distribution ratio in this case is 1:1. Therefore, the distribution ratio of energy (power and electric power) is equal to a ratio between the magnetic field rotational speed NMF and the first rotor rotational speed NR1.

Further, if power is supplied to the first rotor 14 and at the same time electric power is supplied to the stator 15, the driving equivalent torque TSE output from the stator 15 and the first rotor transmission torque TR1 input to the first rotor 14 are combined and is transmitted to the second rotor 16 as the second rotor transmitting torque TR2. That is, the relationship between the driving equivalent torque TSE and the first rotor transmission torque TR1, and the second rotor transmitting torque TR2 satisfies the following equation (7):

$$TR2 = TSE + TR1 \qquad (7)$$

However, in this case, as shown in the aforementioned equation (2), the difference between the magnetic field rotational speed NMF and the second rotor rotational speed NR2 and the difference between the second rotor rotational speed NR2 and the first rotor rotational speed NR1 are equal to each other, and hence the torque combination ratio between the driving equivalent torque TSE and the first rotor transmission torque TR1 is always 1:1. Therefore, the combination ratio of energy (power and electric power) is equal to the ratio between the magnetic field rotational speed NMF and the first rotor rotational speed NR1.

In the first rotating machine 10 constructed as describe above, through the control of the first PDU 22, the ECU 2 controls the electric power supplied to the stator 15 and the electric power generated by the stator 15 and the magnetic field rotational speed NMF of the first and second rotating magnetic fields generated by the supply of electric power and the electric power generation.

As described heretofore, in the power unit 1, the second rotor 16 is mechanically connected to the crankshaft 3c, and the first rotor 14 is mechanically connected to the front wheels WF, WF via the transmission 4. Further, the rotor 24 of the second rotating machine 20 is disposed between the transmission 4 and the front wheels WF, WF. In other words, the rotor 24 of the second rotating machine 20 is mechanically connected to the front wheels WF, WF without via the transmission 4. The stator 23 of the second rotating machine 20 is electrically connected to the stator 15 of the first rotating machine 10.

Figure 2:
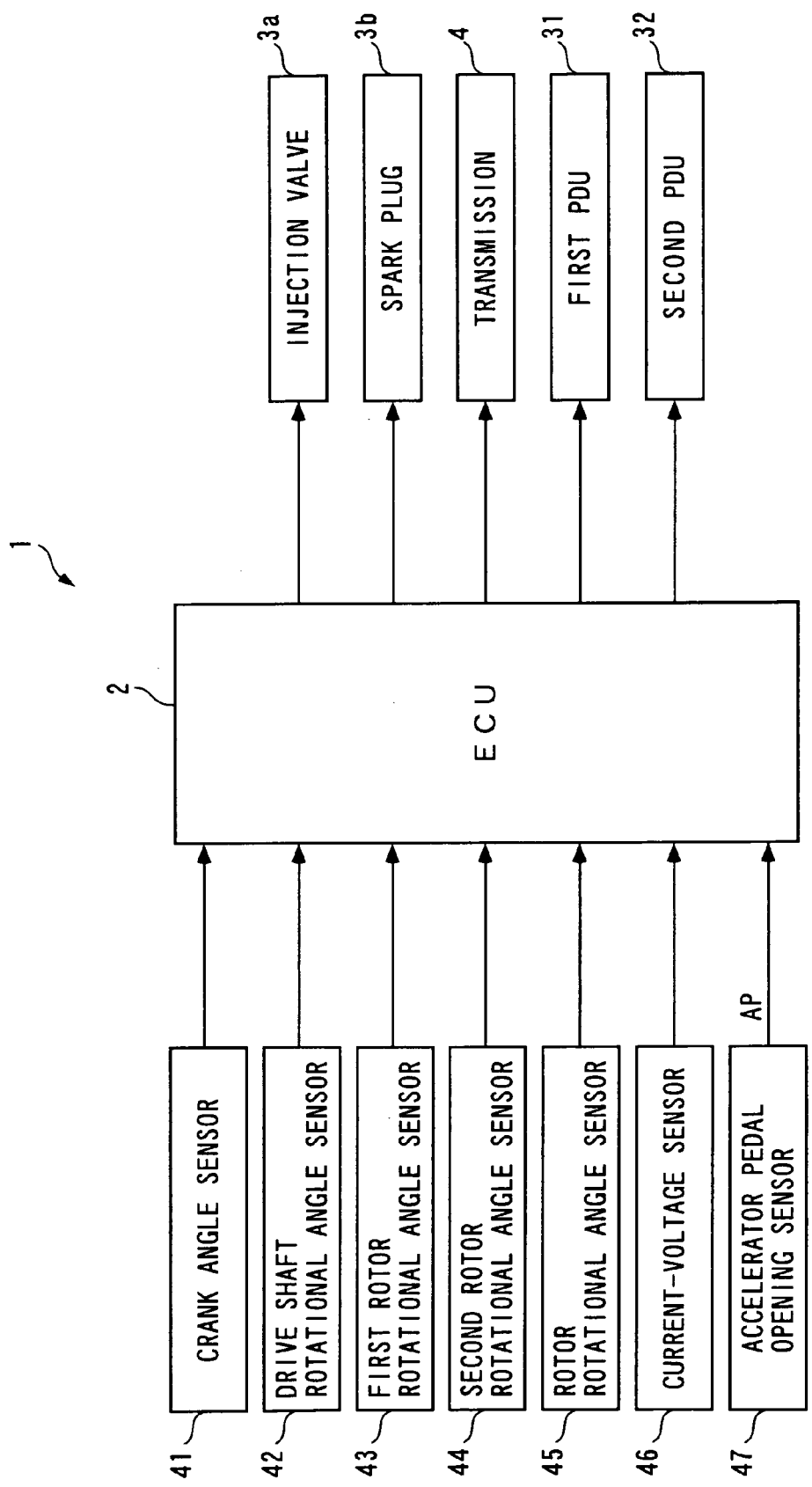
FIG. 2 is a schematic block diagram of part of the power unit.

Further, as shown in FIG. 2, a crank angle sensor 41 and a drive shaft rotational angle sensor 42 deliver respective signals indicative of detected rotational angle positions of the crankshaft 3c and the drive shaft 7 to the ECU 2. The ECU 2 calculates the rotational speed NE of the engine 3 (hereinafter referred to as "the engine speed NE") and the rotational speed ND of the drive shaft 7 (hereinafter referred to as "the drive shaft rotational speed ND"), respectively, based on the detected rotational angle positions of the crankshaft 3c and the drive shaft 7.

Further, a first rotor rotational angle sensor 43 and a second rotor rotational angle sensor 44 supply respective signals indicative of detected rotational angle positions of the first and second rotors 14 and 16 to the ECU 2. The ECU 2 calculates the first and second rotor rotational speeds NR1 and NR based on the respective detected rotational angle positions of the first and second rotors 14 and 16. Further, a rotor rotational angle sensor 45 delivers a signal indicative of a detected rotational angle position of the rotor 24 of the second rotating machine 20 to the ECU 2. The ECU 2 calculates the rotational speed of the rotor 24 based on the detected rotational angle position of the rotor 24.

Moreover, a current-voltage sensor 46 delivers respective signals indicative of detected current and voltage values input to the battery 33 to the ECU 2. The ECU 2 calculates the remaining capacity SOC of the battery 33 based on this signal. Further, an accelerator pedal opening sensor 47 delivers a signal indicative of a detected accelerator opening AP as an stepped-on amount of an accelerator pedal, not shown, of the vehicle V, to the ECU 2.

The ECU 2 is a microcomputer which is comprised of a RAM, a ROM, a CPU, and an I/O interface, none of which are shown, and controls the operations of the engine 3, the transmission 4, and the first and second rotating machines 10 and 20, in response to the signals from the aforementioned sensors 41 to 47.

Next, the operation of the power unit 1 at the start or during running of the vehicle will be described. First, a description will be given of the start of the engine 3 during a stop of the vehicle. To start the engine during a stop of the vehicle, electric power is supplied from the battery 33 to the stator 15 of the first rotating machine 10, to thereby generate first and second rotating magnetic fields, and at the same time cause the generated rotating magnetic fields to rotate in the rotational direction of the crankshaft 3c. As described hereinabove, the second rotor 16 is connected to the crankshaft 3c together with the second rotating shaft 13, whereas the first rotor 14 is connected to the front wheels WF, WF together with the first rotating shaft 12. Therefore, when the engine 3 is at rest during a stop of the vehicle, the first rotor 14 has far larger rotational resistance than the second rotor 16.

Therefore, when electric power is supplied to the stator 15 as described above to generate the first and second rotating magnetic fields, the electric power (energy) is not transmitted to the first rotor 14, but all transmitted to the second rotor 16 as power, as described hereinabove with reference to FIGS. 7 and 8, whereby the second rotor 16 rotates in the direction of rotation of the first and second rotating magnetic fields, i.e. in the direction of rotation of the crankshaft 3c. As a result, in a state where the first rotor 14, and hence the front wheels WF, WF are at rest, the crankshaft 3c performs normal rotation. In this state, the ignition operation of the fuel injection valves 3a and the spark plugs 3b is controlled according to the crank angle position, whereby the engine 3 is started.

Next, the operation of standing start of the vehicle V during operation of the engine 3 will be described. Hereinafter, this manner of start is referred to as "the engine-based start". In this engine-based start, the first rotating machine 10 generates electric power using power of the engine 3 transmitted to the second rotor 16. In this case, the first rotor 14 is at rest together with the front wheels WF, WF, and hence in accordance with this generation of electric power, the power of the engine 3 is not transmitted to the first rotor 14, but is transmitted to the stator 15 as electric power. Further, all the generated electric power is supplied to the second rotating machine 20 via the first and second PDUs 31 and 32, whereby the rotor 24 of the second rotating machine 20 is caused to rotate such that the front wheels WF, WF perform normal rotation. As a result, the front wheels WF, WF perform normal rotation to cause the vehicle V to start.

Next, a description will be given of the operation of the power unit during running of the vehicle V after the above-described engine-based start. In this case, basically, the engine 3 alone is used as a power source, and similarly to the case of the engine-based start, the first rotating machine 10 generates electric power using part of the power of the engine 3 transmitted to the second rotor 16, and at the same time, all the generated electric power is supplied to the second rotating machine 20 (hereinafter, this operation mode is referred to as "engine drive mode"). This causes the power (energy) of the engine 3 transmitted to the second rotor 16 during the engine drive mode to be once divided, and be supplied via the following first transmission path and second transmission path to the rotating shaft 22, where the divided powers are combined, and then transmitted to the front wheels WF, WF via the differential gear mechanism 6.

First transmission path: magnetic circuit→stator 15→first PDU 31→second PDU 32→stator 23→magnetism→rotor 24

Second transmission path: magnetic circuit→first rotor 14→first rotating shaft 12→transmission 4→gear 4b→gear 22a In the first transmission path, transmission of power from the engine 3 to the front wheels WF, WF is performed by an electrical path, and at the same time, in the second transmission path, the transmission of power is not performed by the electrical path but by a magnetic path and a mechanical path. Further, as is clear from the function of the first rotating machine 10, the ratio of power transmitted by the electrical path via the first transmission path and power transmitted by the magnetic path and the mechanical path via the second transmission path is equal to the ratio of the magnetic field rotational speed NMF and the first rotor rotational speed NR1.

Further, during the engine drive mode, by changing the combination of the rotational speed and torque of power transmitted to the front wheels WF, WF via the first transmission path and the rotational speed of power transmitted via the second transmission path through control of the first and second rotating machines 10 and 20, the power transmitted from the engine 3 to the front wheels WF, WF is subjected to stepless speed change. In addition, by changing the speed position of the transmission 4, the power transmitted from the engine 3 to the front wheels WF, WF is subjected to a stepless speed increase or decrease.

Figure 15:
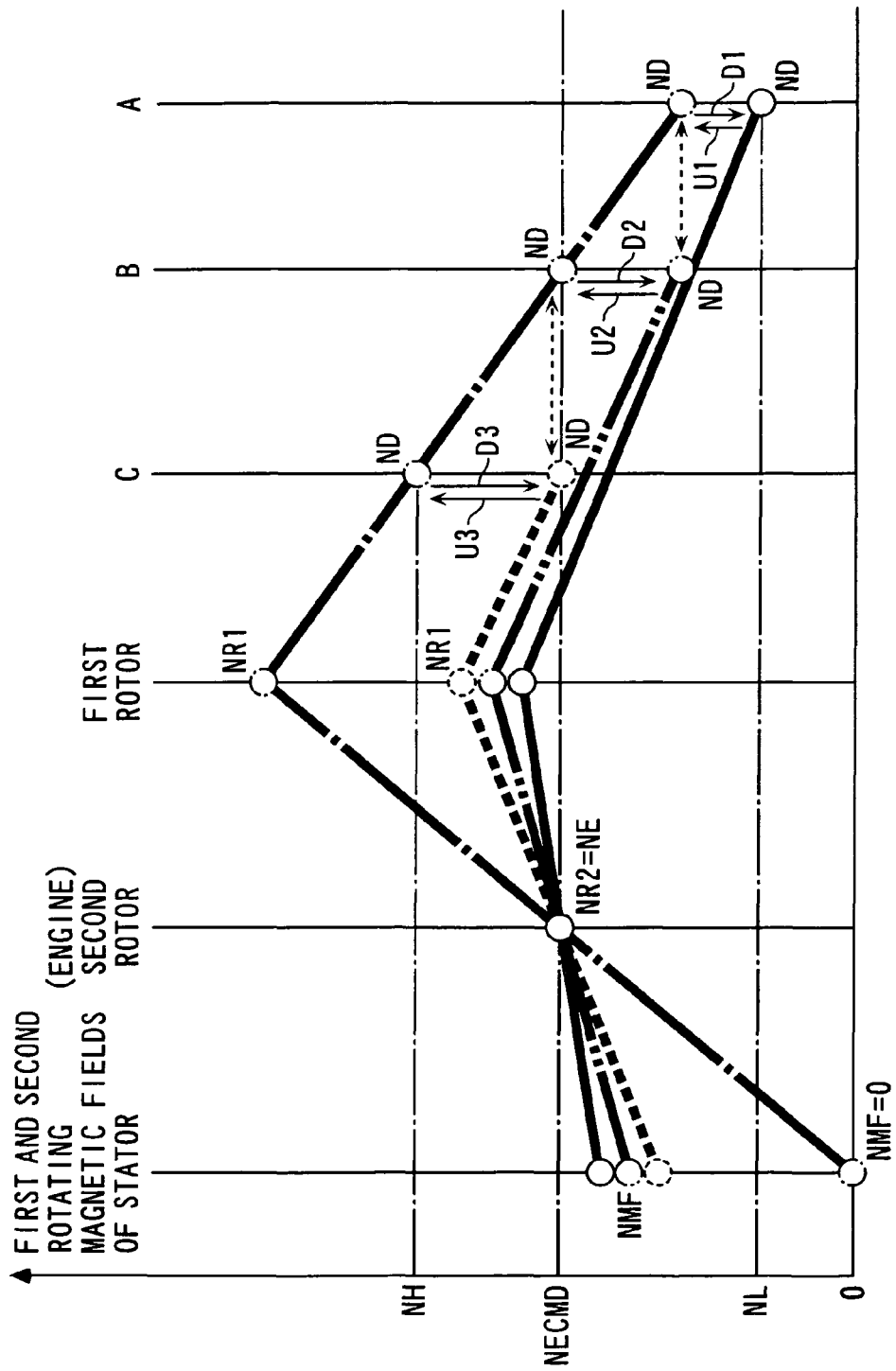
FIG. 15 is a collinear chart illustrating an example of the relationship between the magnetic field rotational speed, the first and second rotor rotational speeds, and a drive shaft rotational speed, during engine drive mode.

Hereinafter, a description will be given of a speed-changing operation using the first and second rotating machines 10 and 20 and the transmission 4 (hereinafter referred to as "the speed-changing operation" as deemed appropriate) with reference to a collinear chart shown in FIG. 15. In FIG. 15, symbols A, B, and C denote lines indicative of values of the drive wheel rotational speed ND, and represent respective cases of the aforementioned first speed, second speed, and third speed of the transmission 4. Further, as mentioned hereinbefore, the second rotor 16 and the crankshaft 3c are connected to each other only via the flywheel 5, and hence as shown in FIG. 15, the engine speed NE and the second rotor rotational speed NR2 are equal to each other. It should be noted that in FIG. 15, the direction of rotation of the crankshaft 3c is the same as the direction of normal rotation of the front wheels WF, WF.

First, a description will be given of a case where the speed of the power transmitted to the front wheels WF, WF is steplessly increased. More specifically, the magnetic field rotational speed NMF is lowered to thereby cause the first rotor rotational speed NR1 to increase. As mentioned hereinabove, the second rotor transmission torque TR2 is always distributed to the stator 15 and the first rotor 14 at a distribution ratio of 1:1. Therefore, by increasing the first rotor rotational speed NR1 as mentioned above, the rotational speed of the power transmitted to the front wheels WF, WF via the second transmission path increases, but there is no change in the torque. Further, the rotational speed of the rotor 24 of the second rotating machine 20 (hereinafter referred to as "the rotor rotational speed") is increased and at the same time the torque of the rotor 24 (hereinafter referred to as "the rotor torque") is lowered. This increases the rotational speed of the power transmitted to the front wheels WF, WF via the first transmission path and reduces the torque of the same. As a result, the speed of the power transmitted from the engine 3 to the front wheels WF, WF is steplessly increased. Further, by performing this speed-increasing operation when the speed position of the transmission 4 is set to one of the first to third speed, the drive wheel rotational speed ND is steplessly increased as indicated by arrows U1 to U3 in FIG. 15.

Inversely to the above, in steplessly reducing the speed of the power transmitted to the front wheels WF, WF, by increasing the magnetic field rotational speed NMF, the first rotor rotational speed NR1 is lowered. This reduces the rotational speed of the power transmitted to the front wheels WF, WF via the second transmission path without changing the torque of the same. Further, the rotor rotational speed is reduced and at the same time the rotor torque is increased, whereby the power transmitted to the front wheels WF, WF via the first transmission path is reduced, and at the same time the torque thereof is increased. As a result, the speed of the power transmitted from the engine 3 to the front wheels WF, WF is steplessly reduced. Further, by performing the above-described speed-reducing operation when the speed position is set to one of the first to third speeds, the drive wheel rotational speed ND is steplessly reduced as indicated by arrows D1 to D3 in FIG. 15.

Next, the operation of changing the speed position of the transmission 4 will be described. First, a description will be given of a case where the speed position is up-shifted to the second speed according to the above-described speed-increasing operation from a state in which the speed position is set to the first speed, and the drive shaft rotational speed ND is equal to the lowest rotational speed NL (indicated by a thick solid line in FIG. 15). First, a speed-increasing operation is carried out by reducing the magnetic field rotational speed NMF, as described above, and when the magnetic field rotational speed NMF is thereby made equal to 0 (indicated by a thick one-dot-chain line in FIG. 15), the speed position is up-shifted to the second speed.

Immediately after the up-shifting, the first rotor rotational speed NR1 becomes lower, as indicated by a two-dot-chain line in FIG. 15, than a value taken immediately before the up-shifting (indicated by the thick one-dot-chain line) since the first rotor 14 is connected to the front wheels WF, WF, via the transmission 4. In a manner coping with the first rotor rotational speed NR1, the magnetic field rotational speed NMF is controlled to be made higher than immediately before the up-shifting. As a result, compared with immediately before the up-shifting, the electric power generated by the first rotating machine 10 increases, and accordingly, the electric power supplied to the second rotating machine 20 also increases. Further, the rotor rotational speed is held at a value assumed immediately before the up-shifting, and the rotor torque is increased by an amount corresponding to the above-mentioned increase in the supplied electric power. Thus, the total transmission gear ratio, i.e. ratio of a change of speed effected by the first and second rotating machines 10, 20, the transmission 4, and so forth immediately after the up-shifting becomes equal to the transmission gear ratio immediately before the up-shifting. It should be noted that also when the speed position is up-shifted from the second speed to the third speed, the operation is performed in the same manner as from the first speed to the second speed, and hence detailed description thereof is omitted.

Next, a description will be given of a case where the speed position is down-shifted to the second speed according to the above-described speed-reducing operation from a state in which the speed position is set to the third speed, and the drive shaft rotational speed ND is equal to the highest rotational speed NH (indicated by the thick one-dot-chain line in FIG. 15). First, the speed-reducing operation is performed by increasing the aforementioned magnetic field rotational speed NMF, and the like, whereby the speed position is down-shifted to the second speed when the drive shaft rotational speed ND is made equal to a value to be taken assuming that the speed position is set to the second speed, and the magnetic field rotational speed NMF is equal to 0 (indicated by the thick broken line in FIG. 15). Thus, the down-shifting to the second speed is executed when the drive shaft rotational speed ND becomes equal to a highest value which can be taken when the speed position is set to the second speed. Immediately after the down-shifting, the first rotor rotational speed NR1 becomes, as indicated by the solid one-dot-chain line in FIG. 15, higher than immediately before the down-shifting (indicated by the thick broken line), and becomes equal to a value to be taken assuming that the magnetic field rotational speed NMF is equal to 0. Further, at the same time, the magnetic field rotational speed NMF is controlled to 0.

Thus, immediately after the down-shifting to the second speed, the power of the engine 3 is not transmitted by the electrical path via the first transmission path, but transmitted only by the magnetic path and the mechanical path via the second transmission path. Further, immediately after the down-shifting, the total transmission gear ratio, i.e. ratio of a change of speed effected by the first and second rotating machines 10, 20, the transmission 4, and so forth becomes equal to the transmission gear ratio immediately before the down-shifting. It should be noted that also when the speed position is down-shifted from the second speed to the first speed, the operation is performed in the same manner as from the third speed to the second speed, and hence detailed description thereof is omitted.

Further, during the shifting of the speed position, i.e. after the gear train established in the transmission 4 is cut off, and before a gear train is established again for a speed to which the speed position is changed, the load on the front wheels WF, WF does not act on the first rotor 14, and hence the electric power is supplied from the battery 33 to the second rotating machine 20 without generating electric power using the power of the engine 3 by the first rotating machine 10. This causes the rotor toque of the second rotating machine 20 to be transmitted to the front wheels WF, WF.

Further, the above-described speed-changing operation is performed such that the engine speed NE becomes equal to a target rotational speed NECMD. The target engine rotational speed NECMD is calculated by searching a NECMD map (not shown) according to the drive shaft rotational speed ND and demanded torque PMCMD. The demanded torque PMCMD is torque demanded by the vehicle V. In the NECMD map, the target engine speed NECMD is set with respect to the values of the drive shaft rotational speed ND and the demanded torque PMCMD assumed at the time, such that optimum fuel economy of the engine 3 is obtained. Further, during the engine drive mode, the power of the engine 3 is basically controlled to be equal to demanded output power determined by the drive shaft rotational speed ND and the demanded torque PMCMD assumed at the time. It should be noted that the demanded torque PMCMD is calculated by searching a map (not shown) according to the drive shaft rotational speed ND and the accelerator opening AP.

Further, during execution of the speed-changing operation, by the down-shifting of the speed position of the transmission 4 as described hereinbefore, the magnetic field rotational speed NMF is held at a value lower than the first rotor rotational speed NR1, as shown in FIG. 15. As described hereinbefore, a ratio between the power transmitted to the front wheels WF, WF by the electrical path via the first transmission path and the power transmitted to the front wheels WF, WF by the magnetic path and the mechanical path via the second transmission path is equal to a ratio between the magnetic field rotational speed NMF and the first rotor rotational speed NR1. Therefore, by controlling the magnetic field rotational speed NMF and the first rotor rotational speed NR1, during the engine drive mode, the power transmitted from the engine 3 to the front wheels WF, WF by the electrical path via the first transmission path is always made smaller than the power transmitted by the magnetic path and the mechanical path via the second transmission path.

By the above-described speed-changing operation, in the power unit 1, the speed of the power of the engine 3 is steplessly and smoothly increased or reduced, and then transmitted to the front wheels WF, WF. This causes the drive shaft rotational speed ND to be steplessly and smoothly increased and reduced between the lowest rotational speed NL and the highest rotational speed NH, in the case of the FIG. 15 example. It should be noted that each of the speed positions of the transmission 4 and the transmission gear ratio are set such that the above-described speed-changing operation can be performed appropriately.

Figure 16:
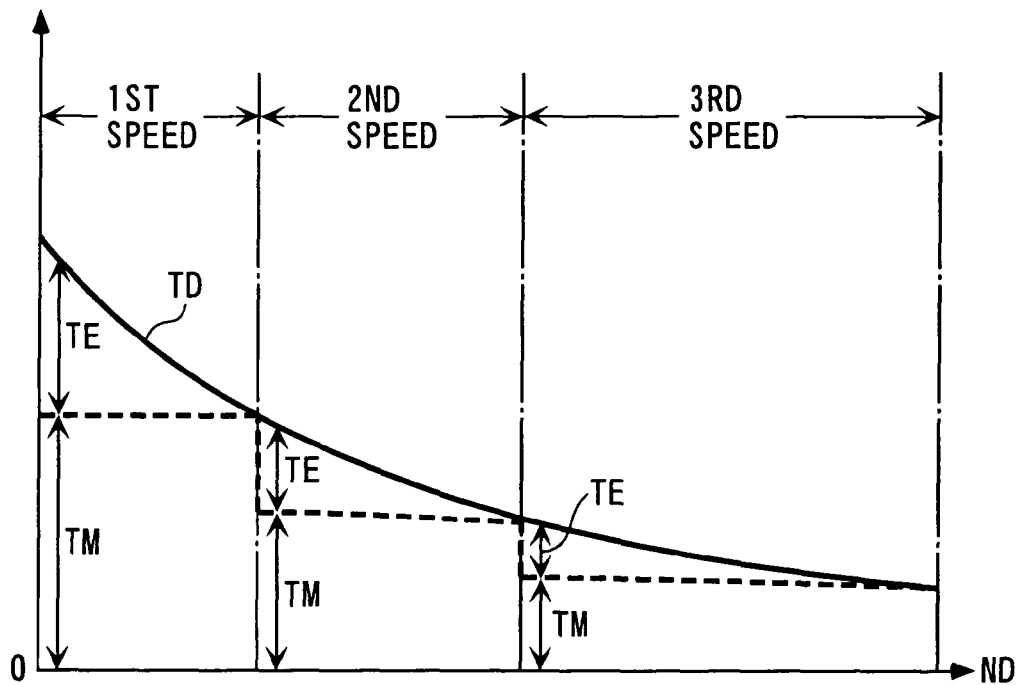
FIG. 16 is a diagram showing an example of the relationship between the drive shaft rotational speed, front-wheel transmission torque, electrical path torque, and magnetic-mechanical path torque, in a case where the torque of the engine and the engine speed are fixed.
Figure 17:
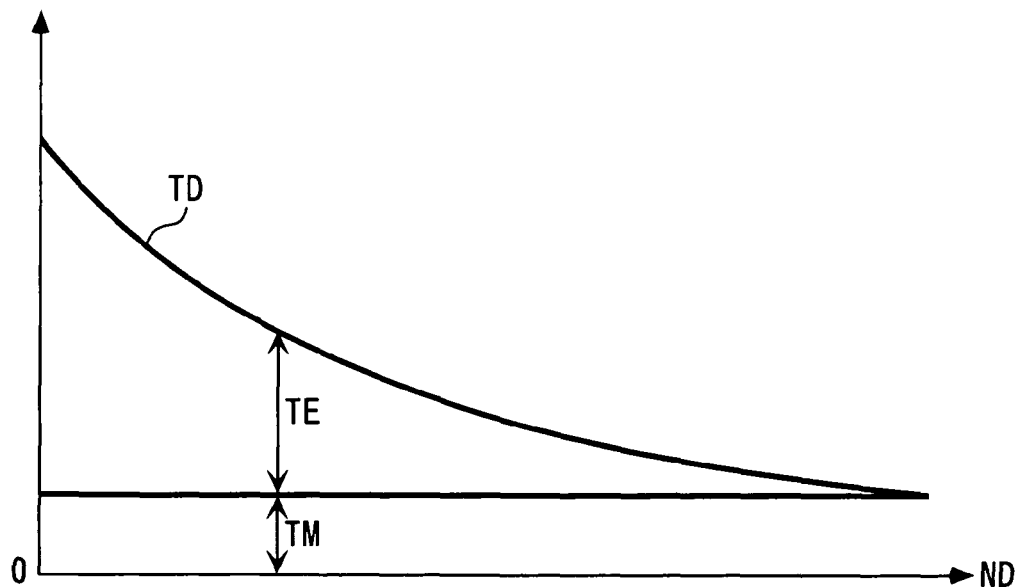
FIG. 17 is a diagram showing a comparative example of FIG. 16.

FIG. 16 schematically shows an example of the relationship between the drive shaft rotational speed ND and the torque transmitted to the front wheels WF, WF (hereinafter referred to as "the front-wheel transmission torque") TD in a case where the torque of the engine 3 and the engine rotational speed NE are fixed in the engine drive mode. On the other hand, a comparative example shown in FIG. 17 schematically illustrates an example of the relationship between the drive shaft rotational speed ND and the front-wheel transmission torque TD in the case where the speed-changing operation is performed using the first and second rotating machines 10 and 20 alone without provision of the transmission 4. In FIGS. 16 and 17, "TE" denotes torque transmitted by the electrical path via the first transmission path, while "TM" denotes torque transmitted by the magnetic path and the mechanical path via the second transmission path (hereinafter referred to as "the electrical path torque TE" and "the magnetic-mechanical path torque TM"), respectively. That is, the electrical path torque TE is equal to the rotor torque of the second rotating machine. It should be noted that in the following description referring to FIG. 16 et seq., a description as to during shifting of the speed position of the transmission 4, i.e. after the gear train is cut off, and before the gear train is established again for a speed to which the speed position is changed is omitted, and the speed change by the differential gear mechanism 6 and power transmission loss occurring in the related components are ignored.

As described heretofore, since the power is transmitted to the front wheels WF, WF via the first and second transmission paths, and hence, basically, the sum of the electrical path torque TE and the magnetic-mechanical path torque TM is equal to the front-wheel transmission torque TD. Further, in each speed position, in steplessly increasing the speed of the power transmitted to the front wheels WF, WF, the rotor torque, i.e. the electrical path torque TE is lowered. Therefore, in each speed position, as the drive shaft rotational speed ND is higher, the electrical path torque TE becomes smaller. Further, immediately before and immediately after the shifting of the speed position, the magnetic field rotational speed NMF is controlled to 0, whereby the power of the engine 3 is not transmitted via the electrical path but is transmitted only by the magnetic path and the mechanical path. Therefore, as shown in FIG. 16, when shifting between the first position and the second position and between the second position and the third position, the front-wheel transmission torque TD becomes equal to the magnetic-mechanical path torque TM.

Further, in the first rotating machine, as is clear from the above-mentioned fact that the second rotor transmission torque TR2 is distributed at a distribution ratio of 1:1 to the stator 15 and the first rotor 14, half the second rotor transmission torque TR2 is always transmitted to the first rotor 14. Accordingly, as shown in FIG. 16, the magnetic-mechanical path torque TM is fixed when the speed position is at each of the first to third speeds, and as the drive shaft rotational speed ND changes and the speed position is shifted, the magnetic-mechanical path torque TM is changed in steps. Further, the magnetic field rational speed NMF is held at a value lower than the first rotor rotational speed NR1, whereby the power transmitted by the electrical path via the first transmission path is made smaller than the power transmitted by the magnetic path and the mechanical path via the second transmission path. From this fact and the fact that the respective rotational speeds of the powers transmitted via the first and second transmission paths are equal to each other, as shown in FIG. 16, the electrical path torque TE is always made smaller than the magnetic-mechanical path torque TM.

In contrast, in the comparative example shown in FIG. 17, differently from the present embodiment, the torque distributed to the first rotor 14 is transmitted to the front wheels WF, WF without being subjected to a speed change by the transmission 4, and hence as shown in FIG. 17, the magnetic-mechanical path torque TM is fixed irrespective of the drive shaft rotational speed ND. Further, in this case, when the drive shaft rotational speed ND is lower than the engine speed NE, to make the first rotor rotational speed NR1 lower than the engine speed NE in accordance therewith, the magnetic field rotational speed NMF is required to be made higher than the first rotor rotational speed NR1. In other words, the power transmitted by the electrical path is required to be made larger than the power transmitted by the magnetic path and the mechanical path. To this end, as shown in FIG. 17, in a region where the drive shaft rotational speed ND is relatively low, the electrical path torque TE is larger than the magnetic-mechanical path torque TM.

On the other hand, in the engine drive mode, when the remaining capacity of the battery 33 is larger than a lower limit value SOCL, and at the same time the aforementioned demanded torque PMCMD is larger than a first predetermined value PM1, in addition to the electric power generated by the first rotating machine 10, the electric power is supplied to the second rotating machine 20 from the batter 33, whereby the engine 3 is assisted by the second rotating machine 20. The lower limit value SOCL is set to such a predetermined value as will prevent the battery 43 from overdischarging, and the aforementioned first predetermined value PM1 is calculated by searching a PM1 table (not shown) according to the drive shaft rotating speed ND. In the PM1 table, the first predetermined value PM1 is set in association with the drive shaft rotational speed ND to a value slightly larger than a torque value at which the optimum fuel economy of the engine 3 is obtained.

As describe above, during the engine drive mode, when an sufficient amount of electric power remains in the battery 33, and at the same time, the aforementioned demanded output power is larger than such a value at which the optimum fuel economy of the engine 3 (hereinafter referred to as "the optimum fuel economy power") is obtained, the assist by the second rotating machine 20 is performed. Further, in this case, the power of the engine 3 is controlled such that the optimum fuel economy is obtained, and at the same time the electric power supply from the battery 33 is performed such that an amount of the power of the engine 3 short of the demanded output power is made up for. Further, when calculating the target engine speed NECMD, a value obtained by dividing the optimum fuel economy power by the drive shaft rotational speed ND is used as the demanded torque PMCMD.

Further, in the engine drive mode, when the remaining capacity SOC is smaller than an upper limit value SOCH, and at the same time, the demanded torque PMCMD is smaller than a second predetermined value PM2, part of the electric power generated by the first rotating machine 10 is charged in the battery 33, and the remainder is supplied to the second rotating machine 20. The aforementioned upper limit value SOCH is set to such a predetermined value as will prevent the battery 43 from being overcharged, and the aforementioned second predetermine value PM2 is calculated by searching a PM2 table (not shown) according to the drive shaft rotational speed ND. In the PM2 table, the second predetermined value PM2 is set in association with the drive shaft rotational speed ND to a torque value slightly smaller than a value at which the optimum fuel economy of the engine 3 is obtained.

As described above, during the engine drive mode, when the electric power of the battery 33 is relatively small, and at the same time the demanded output power is smaller than the optimum fuel economy power, the battery 33 is charged by the first rotating machine 10. Further, in this case, the power of the engine 3 is controlled such that the optimum fuel economy is obtained, and the charging of the battery 33 is performed in a manner consuming surplus power of the engine 3 with respect to the demanded output power. Further, similarly to the case of the assistance described above, when calculating the target engine speed NECMD, a value obtained by dividing the optimum fuel economy power by the drive shaft rotational speed ND is used as the demanded torque PMCMD.

Further, during deceleration of the vehicle V, in other words, in the case where the accelerator opening AP is approximately equal to 0 and no power is output from the engine 3 or the like, causing the vehicle V to run by inertia, if the remaining capacity SOC is smaller than the aforementioned upper limit value SOCH, the power of the front wheels WF, WF is used to cause the first rotating machine 10 and/or the second rotating machine 20 to perform electric power generation, and the generated electric power is caused to charge the battery 33.

As described above, according to the present embodiment, during the engine drive mode, by down-shifting the speed position of the transmission 4, the power transmitted by the electrical path is controlled to be always smaller than the power transmitted by the magnetic path and the mechanical path, whereby the efficiency of driving the front wheels WF, WF can be increased. For the same reason, it is possible to reduce the size, weight, and manufacturing costs of the second rotating machine 20. Further, by the speed-changing operation using the transmission 4, and the first and second rotating machines 10 and 20, it is possible to steplessly increase or reduce the speed of the power transmitted from the engine 3 to the front wheels WF, WF, in a state where the power transmitted by the electrical path is controlled to be small as described above.

Further, the above-mentioned speed-changing operation is performed such that the engine speed NE becomes equal to the target engine speed NECMD. Further, the power of the engine 3 is controlled such that the optimum fuel economy of the engine 3 can be obtained. When the power of the engine 3 controlled as such is short of the demanded output power, the shortage amount is made up for by the assistance by the second rotating machine 20, whereas when the same is surplus with respect to the demanded output power, the surplus amount is consumed by charging of the battery 33 by the first rotating machine 10. This makes it possible to obtain the optimum fuel economy of the engine 3, and hence further improve the driving efficiency.

Further, during the engine drive mode, by controlling the magnetic field rotational speed NMF to 0, all the power of the engine 3 can be transmitted by the magnetic path and the mechanical path without using the electrical path, whereby it is possible to further increase the driving efficiency. Further, since the second rotor 16 is formed by the first and second cores 16b, 16c formed of a soft magnetic material, the second rotor 16 is magnetized by the first and second rotating magnetic fields and the permanent magnet 14c of the first rotor 14, so that the first rotating machine 10 functions as the synchronous machine. This makes it possible to make the efficiency of the first rotating machine 10 higher than that of the conventional one which functions as an induction machine, which makes it possible to further increase the driving efficiency. Further, for the same reason described above, the durability of the second rotor 16 can be made higher than that of the intermediate rotor of the conventional power unit, which in turn makes it possible to improve the durability of the power unit 1 in its entirety. Further, since the second rotor 16 with a high durability is connected to the engine 3, the power unit 1 can fully withstand repeated power transmission from the engine 3, and properly transmit the power to the front wheels WF, WF.

Further, since the transmission 4 is a gear-type stepped transmission, compared with a belt-type stepless transmission, it is possible to reduce power transmission loss in the transmission 4, and therefore, to further improve the driving efficiency. Further, since the second rotating machine 20 is connected to the front wheels WF, WF without via the transmission 4 and the rotor torque of the second rotating machine 20 is transmitted to the front wheels WF, WF during the shifting of the speed position of the transmission 4, it is possible to suppress a speed-change shock, such as a sudden decrease in torque, which can be caused by interruption of transmission of torque of the engine 3.

Although in the first embodiment, the power unit 1 drives the front wheels WF, WF, it may drive the rear wheels WR, WR. Further, in the first embodiment, the second rotating machine 20 is disposed between the transmission 4 and the front wheels WF, WF, it may be disposed, insofar as it connects the second rotating machine 20 to the front wheels WF, WF without via the transmission 4, as follows: Both the gear 4b of the transmission 4 and the gear 22a of the second rotating machine 20 are brought into direct mesh with the gear 6a of the differential gear mechanism 6. In this case, the torque transmitted via the transmission 4 is transmitted to the front wheels WF, WF without via the rotating shaft 22 of the second rotating machine 20, and hence it is possible to further reduce the size, weight, and manufacturing costs of the second rotating machine 20.

Further, a brake, e.g. an electromagnetic brake, for holding the second rotor 16 in an unrotatable state may be provided. In this case, by supplying electric power to the first and second rotating machines 10 and 20 in a state where the second rotor 16 is held unrotatable by the electromagnetic brake, the powers of the first and second rotating machines 10 and 20 can be transmitted to the front wheels WF, WF, and hence it is possible to cause the vehicle V to start without using the power from the engine 3. Further, in this case, the front wheels WF, WF can be driven using the powers of both the first and second rotating machines 10 and 20, which makes it possible to prevent the second rotating machine 20 from being increased in size.

Figure 18:
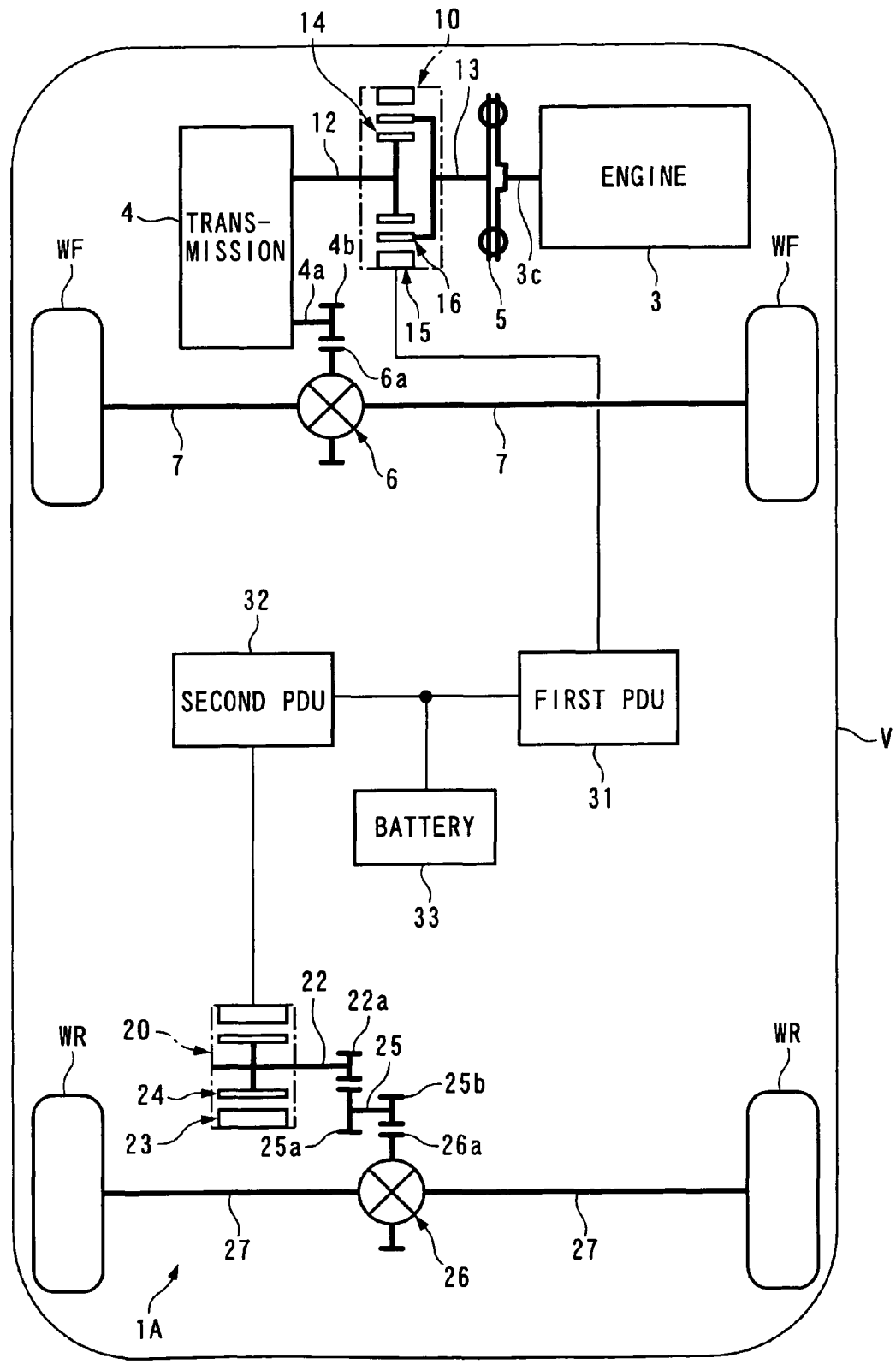
FIG. 18 is a schematic diagram of a vehicle to which is applied a power unit according to a second embodiment of the invention.
Figure 19:
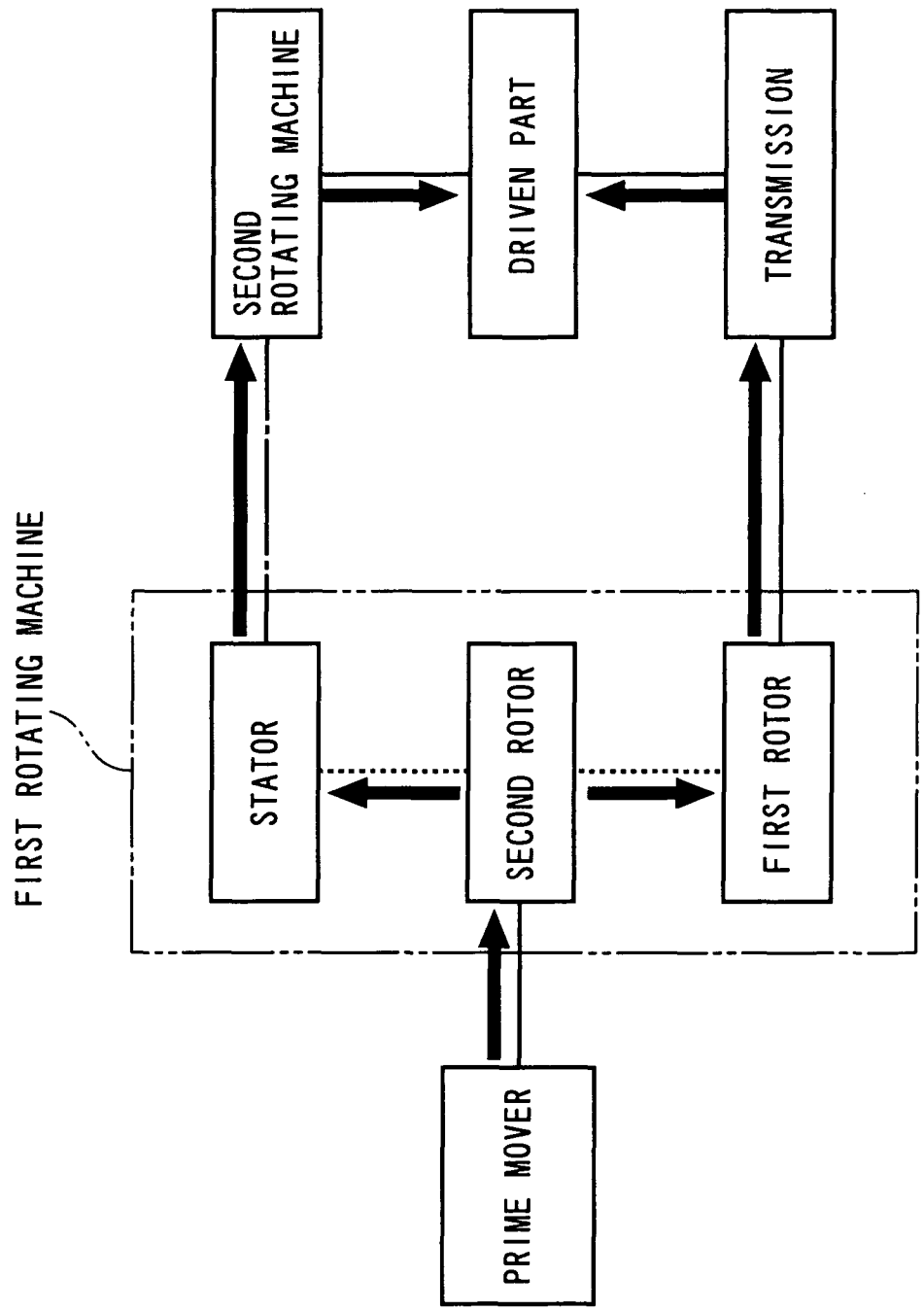
FIG. 19 is a diagram useful in explaining the arrangement and operation of the power unit according to the invention as claimed in claim 1.
Figure 20:
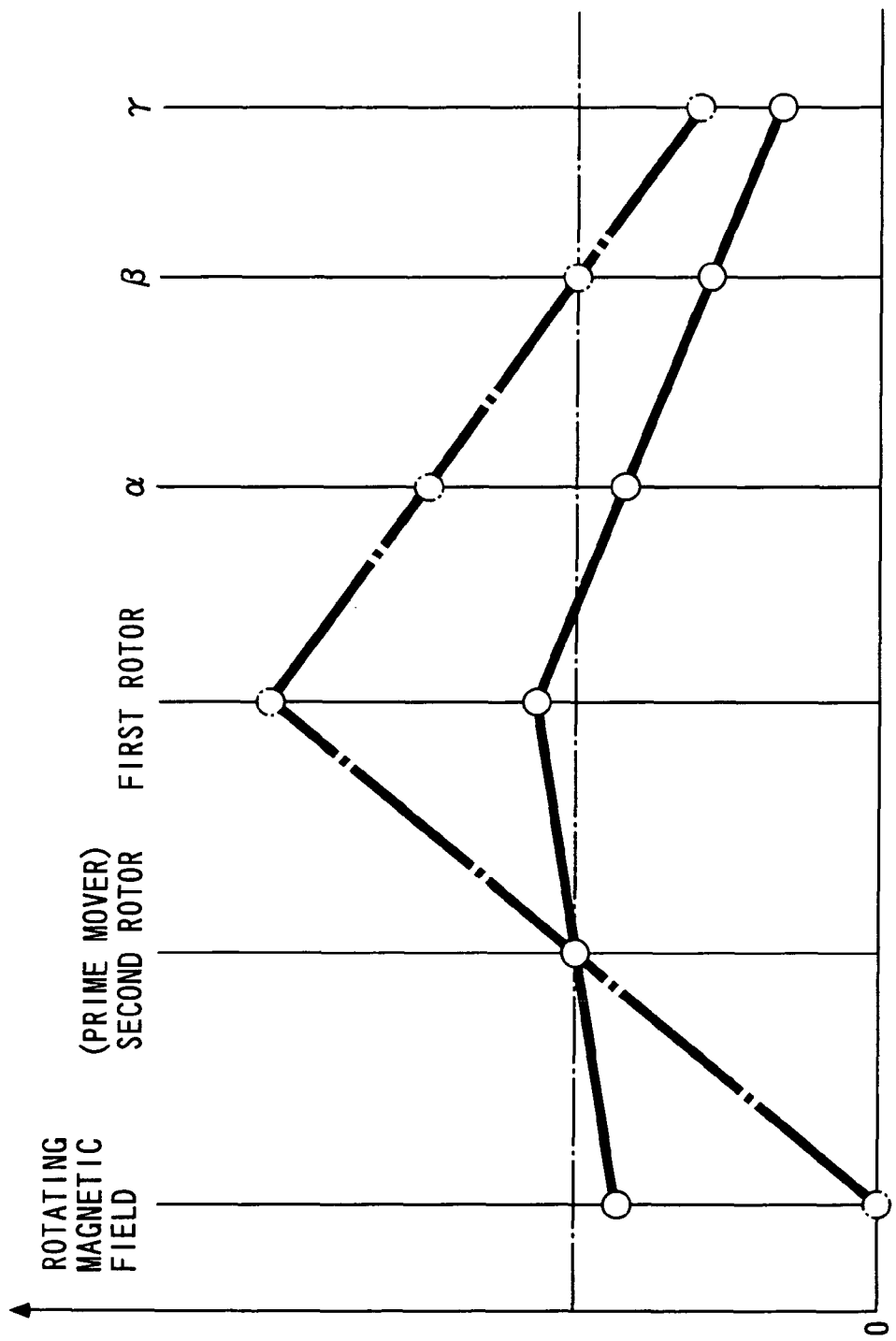
FIG. 20 is a collinear chart illustrating an example of the relationship between the magnetic field rotational speed, the first and second rotor rotational speeds, the rotational speed of a prime mover, and the speed of a driven part of the power unit shown in FIG. 19.
Figure 21:
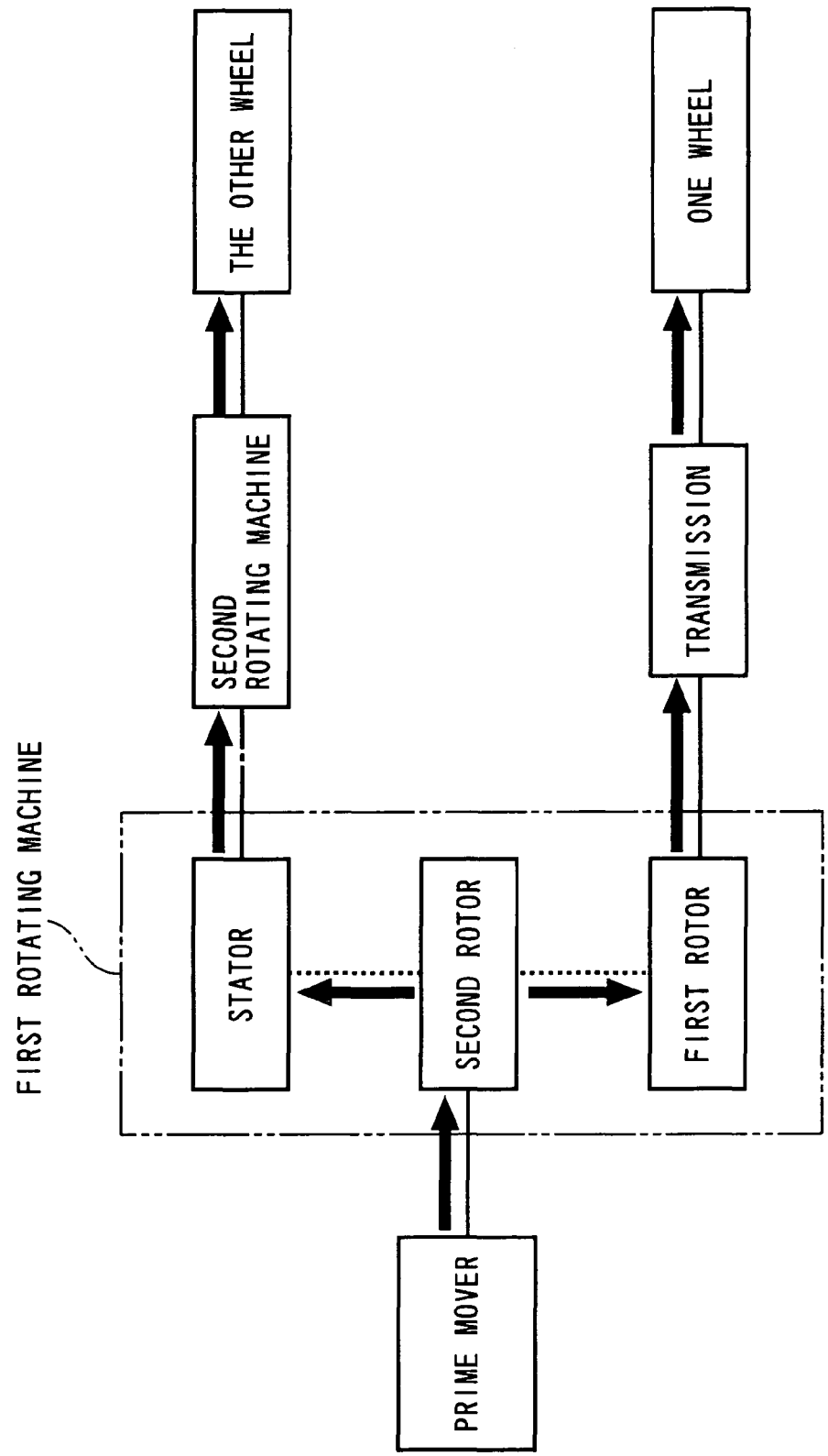
FIG. 21 is a diagram useful in explaining the arrangement and operation of a power unit according to an invention as claimed in claim 2.

Next, a power unit 1A according to a second embodiment of the present invention will be described with reference to FIG. 18. The power unit 1A is distinguished from the power unit 1 according to the first embodiment in that the front wheels WF, WF and the rear wheels WR, WR are driven thereby. From this difference, the second embodiment is mainly different in construction from the first embodiment that the second rotating machine 20 is mechanically connected to the rear wheels WR, WR. In FIG. 18, the component elements identical to those of the first embodiment are denoted by the same reference numerals. The following description is mainly given of different points from the first embodiment.

The gear 22a integrally formed with rotating shaft 22 of the second rotating machine 20 is in mesh with a first gear 25a, and the first gear 25a is integrally formed on an idler shaft 25. The idler shaft 25 has a second gear 25b integrally formed thereon, and the second idler gear 25b is in mesh with a gear 26a of the differential gear mechanism 26. The differential gear mechanism 26 has the left and right rear wheels WR, WR connected thereto via the left and right drive shafts 27, 27, respectively. With this arrangement, the power of the second rotating machine 20 is transmitted to the rear wheels WR, WR via the differential gear mechanism 26 and so forth. Further, the gear 4b integrally formed with the output shaft 4a of the transmission 4 is in mesh with the gear 6a of the differential gear mechanism 6.

Further, in the power unit 1A, similarly to the first embodiment, the aforementioned various operations including the operation in the engine drive mode are executed. In this case, since the second rotating machine 20 is connected to the rear wheels WR, WR, the power of the engine 3 is distributed to the front wheels WF, WF and the rear wheels RF, RF, during the engine drive mode. Therefore, it is possible to drive the front wheels WF, WF and the rear wheels WR, WR simultaneously, and realize an all-wheel drive vehicle. Further, similarly to the first embodiment, since the power transmitted by the electrical path can be always smaller than the power transmitted by the magnetic path and the mechanical path, it is possible to improve the efficiency of driving the entire wheels including the front wheels WF, WF and the rear wheels WR, WR. For the same reason, it is possible to reduce the size, weight, manufacturing costs of the second rotating machine 20. Further, it is possible to obtain other various effects similar to those obtained by the first embodiment, including the capability of transmitting the power of the engine 3 to the whole wheels including the front wheels WF, WF and the rear wheels WR, WR after steplessly increasing or reducing the speed of the power.

Although in the second embodiment, the transmission 4 is connected to the front wheels WF, WF and the second rotating machine 20 is connected to the rear wheels WR, WR, inversely, the transmission 4 may be connected to the rear wheels WR, WR, and the second rotating machine 20 to the front wheels WF, WF.

Further, the present invention is by no means limited to the above-described embodiment, but can be practiced in various forms. For example, although in the embodiments, the transmission 4 having the speed positions of the first to third speeds is described by way of example, the number of speed positions is not limited to this, but it is to be understood that any suitable number of speed positions may be employed. This also applies to transmission gear ratio of each of the speed positions. Further, although in the embodiments, the gear-type stepped transmission is employed as the transmission 4, a belt-type or a toroidal-type stepless transmission may be employed. Further, although the brushless DC motor is employed as the second rotating machine 20, an AC motor may be employed. Furthermore, although the first and second cores 16b, 16c are formed by steel plates, they may be formed by any other suitable soft magnetic material.

Moreover, although in the embodiments, as the prime mover, the engine 3, i.e. a gasoline engine is employed, a diesel engine may be employed, and further, an external combustion engine, or a mechanism that outputs power by a human power, e.g. bicycle pedals may employed. Further, although the embodiments are examples of application of the power units 1 and 1A to the vehicle V, this is not limitative, but the power units 1 and 1A may be also applied to ships or boats, and aircrafts. Further, although in the embodiments, as control units that control the engine 3, the first and second rotating machines 10 and 20, the ECU 2, and the first and second PDUs 31 and 32 are employed, an electric circuit on which a microcomputer is installed may be employed.

It is further understood by those skilled in the art that the foregoing are preferred embodiments of the invention, and that various changes and modifications may be made without departing from the spirit and scope thereof.

We claim:

1. A power unit that drives a driven part for propelling a transport mechanism, comprising:
    a prime mover;
    a transmission that is mechanically connected to said prime mover;
    a first rotating machine including an immovable stator for generating a rotating magnetic field, a first rotor formed by magnets and disposed in an opposed relation to said stator, and a second rotor formed of a soft magnetic material and disposed between said stator and said first rotor, said first rotating machine being configured to input and output energy between said stator, said first rotor, and said second rotor, via magnetic circuits formed by generation of the rotating magnetic field, and such that in accordance with the energy input and output, the rotating magnetic field, and said first and second rotors rotate while maintaining a linear relation in which a difference in a rotational speed of the rotating magnetic field and a rotational speed of said second rotor, and a difference between the rotational speed of said second rotor and a rotational speed of said first rotor are equal to each other, said second rotor being mechanically connected to said prime mover, and said first rotor being mechanically connected to said transmission; and
    a second rotating machine mechanically connected to said driven part without via said transmission, and electrically connected to said stator.

2. A power unit as claimed in claim 1, wherein the transport mechanism is a vehicle, and said driven part comprises a front wheel and a rear wheel of the vehicle,
    wherein said transmission is mechanically connected to one of said front wheel and said rear wheel, and
    wherein said second rotating machine is mechanically connected to the other of said front wheel and said rear wheel, and is electrically connected to said stator.

3. A power unit as claimed in claim 1, wherein said transmission is a gear-type stepped transmission including a plurality of gear trains which are different in gear ratio from each other, and outputs power input thereto after changing a speed of the power by one of the gear trains.

* * * * *